United States Patent
Ruxton

(10) Patent No.: US 11,037,089 B2
(45) Date of Patent: Jun. 15, 2021

(54) UNMANNED AERIAL VEHICLE DELIVERY SYSTEM

(71) Applicant: Wing Aviation LLC, Mountain View, CA (US)

(72) Inventor: Adam Ruxton, Mountain View, CA (US)

(73) Assignee: Wing Aviation LLC, Mountain View, CA (US)

(*) Notice: Subject to any disclaimer, the term of this patent is extended or adjusted under 35 U.S.C. 154(b) by 464 days.

(21) Appl. No.: 15/963,610

(22) Filed: Apr. 26, 2018

(65) Prior Publication Data
US 2019/0332998 A1     Oct. 31, 2019

(51) Int. Cl.
*G06Q 10/08* (2012.01)
*B64C 39/02* (2006.01)

(52) U.S. Cl.
CPC ......... *G06Q 10/083* (2013.01); *B64C 39/024* (2013.01); *B64C 2201/128* (2013.01)

(58) Field of Classification Search
CPC ............... G06Q 10/083; B64C 39/024; B64C 2201/128
See application file for complete search history.

(56) References Cited

U.S. PATENT DOCUMENTS

| | | | |
|---|---|---|---|
| 6,498,454 B1 * | 12/2002 | Pinlam | H02J 7/0027 320/107 |
| 7,584,020 B2 | 9/2009 | Bruemmer et al. | |
| 9,264,849 B1 * | 2/2016 | Kahn | G06Q 10/04 |

(Continued)

FOREIGN PATENT DOCUMENTS

| | | |
|---|---|---|
| CA | 2 898 304 A1 | 1/2017 |
| DE | 10 2016 010 690 A1 | 3/2018 |

(Continued)

OTHER PUBLICATIONS

Foreign Correspondent, "Game of Drones: A giant leap for mankind or a hazardous lurch into the unknown? A tiny Australian venture is racing to rule the skies—as drone companies vie to deliver mail, medicines and margherita pizza to your door.", Sydney, Australian Broadcasting Corporation, May 17, 2016.*

(Continued)

*Primary Examiner* — Nathan Erb
(74) *Attorney, Agent, or Firm* — Christensen O'Connor Johnson Kindness PLLC

(57) ABSTRACT

Aspects of the disclosure relate to delivery systems including unmanned aerial vehicles (UAVs). For instance, a UAV may have one or more computing devices. These computing devices may be configured to receive sensor data for a predetermined delivery area and use the sensor data to identify one or more grid cells of a grid corresponding to a map of the predetermined delivery area. The identified grid cells correspond to locations acceptable for delivery by the UAV. The computing devices may also be configured to receive, from a mobile receptacle unit (MRU), information identifying a set of grid cells of the grid identified by the MRU as being acceptable for delivery, determine a delivery location by identifying a common grid cell between the identified one or more grid cells and the set of grid cells, and send the common grid cell to the MRU in order to attempt a delivery.

19 Claims, 22 Drawing Sheets

(56) References Cited

U.S. PATENT DOCUMENTS

| | | | |
|---|---|---|---|
| 9,580,173 B1 | 2/2017 | Burgess et al. | |
| 9,896,207 B2 | 2/2018 | Natarajan et al. | |
| 2015/0370251 A1* | 12/2015 | Siegel | B64D 1/22 701/2 |
| 2016/0091319 A1* | 3/2016 | Bonnell | G01C 21/3476 701/461 |
| 2016/0117934 A1* | 4/2016 | Soundararajan | G01S 1/44 701/3 |
| 2017/0283057 A1 | 10/2017 | Thompson et al. | |
| 2018/0024554 A1 | 1/2018 | Brady et al. | |
| 2018/0053139 A1 | 2/2018 | Stoman | |
| 2018/0121877 A1* | 5/2018 | Doherty | G06Q 10/08355 |
| 2018/0137454 A1 | 5/2018 | Kulkarni et al. | |
| 2018/0261112 A1* | 9/2018 | O'Brien | B64D 1/08 |
| 2019/0114564 A1* | 4/2019 | Ferguson | G06Q 10/06312 |
| 2019/0158597 A1* | 5/2019 | Evans | G08G 5/0017 |
| 2019/0233111 A1* | 8/2019 | High | B64D 1/12 |
| 2019/0266819 A1* | 8/2019 | McHale | A47G 29/141 |

FOREIGN PATENT DOCUMENTS

| | | | | |
|---|---|---|---|---|
| WO | 2015/160672 A1 | 10/2015 | | |
| WO | WO 2016/204843 A2 * | 12/2016 | | B64C 39/02 |

OTHER PUBLICATIONS

International Search Report and Written Opinion from the International Searching Authority dated Jul. 12, 2019 for International Application No. PCT/US2019/027856, filed Apr. 17, 2019, 15 pages.

Wikipedia, "Robotic mapping," last revised Jul. 14, 2017, retrieved Jun. 7, 2019, 3 pages.

\* cited by examiner

FIGURE 3A
FIGURE 3B
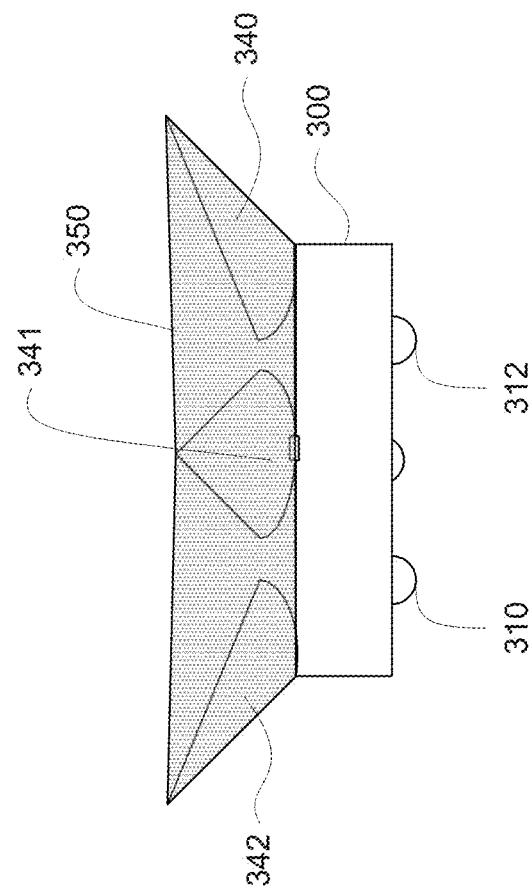
FIGURE 3C

UNMANNED AERIAL VEHICLE DELIVERY SYSTEM

BACKGROUND

Delivery services, also known as courier services, mail services, and shipping services, such as those offered by the U.S. Postal Service and commercial carriers, provide delivery of letters, packages, and parcels to and from residences and businesses across the country. As the number of deliveries increases, alternative methods of such delivery services are becoming more and more popular. For instance, unmanned aerial vehicle (UAV) may be used to perform various tasks relating to delivery services, including, for instance, picking up and dropping off packages for "last mile" deliveries. These UAVs can be controlled by a remote operator and/or operate autonomously to complete such tasks. UAVs can therefore be efficient tools for providing such services. However, as UAV deliveries becomes a reality, ensuring safe, secure and user-friendly delivery will be a significant challenge.

BRIEF SUMMARY

Aspects of the present disclosure provide a delivery system. The delivery system includes a UAV having one or more computing devices configured to receive sensor data for a predetermined delivery area; use the sensor data to identify one or more grid cells of a grid corresponding to a map of the predetermined delivery area, the identified one or more grid cells corresponding to locations acceptable for delivery by the UAV; receive, from a mobile receptacle unit (MRU), information identifying a set of grid cells of the grid identified by the MRU as being acceptable for delivery; determine a delivery location by identifying a common grid cell between the identified one or more grid cells and the set of grid cells received from the MRU; and send the common grid cell to the MRU in order to attempt a delivery of a package at the delivery location.

In one example, the one or more computing devices are further configured to rank the identified one or more grid cells, and wherein the ranking is also used to identify the common grid cell where there is more than one common grid cell. In another example, the one or more computing devices are further configured to receive, from the MRU, a ranking for the set of grid cells, and wherein the ranking is also used to identify the common grid cell where there is more than one common grid cell. In this example, the one or more computing devices are also configured to rank the identified one or more grid cells, and wherein the ranking of the identified one or more grid cells is also used to identify the common grid cell where there is more than one common grid cell. In another example, the one or more computing devices are further configured to: maneuver the UAV to a delivery position with respect to the delivery location; receive confirmation that the MRU is located at the delivery location; and attempt to deliver the package to the MRU from the delivery position. In this example, the one or more computing devices are also configured to receive sensor information identifying wind conditions at the predetermined delivery area and to use the sensor information to maneuver the UAV to the delivery position with respect to the delivery position. In this example, the sensor information is received from an anemometer of the UAV. In addition or alternatively, the sensor information is received from an anemometer of the MRU.

In another example, the delivery system also includes the MRU. In this example, the MRU includes one or more panels configured to open in order to reveal a receptacle area of the MRU, and wherein the receptacle area is configured to accept delivery of the package from the UAV. In addition, the one or more panels include at least two panels and the MRU further includes mesh material arranged between the at least two panels in order to increase a likelihood of the package reaching the receptacle area. In addition or alternatively, the one or more panels are configured to close in order to enclose the package within the receptacle area. In addition or alternatively, the receptacle area includes a sensor configured to confirm delivery of the package. In addition or alternatively, the MRU further includes one or more computing devices configured to maneuver the MRU through the predetermined delivery area and collect sensor data for the predetermined delivery area while maneuvering the MRU; identify obstacles in the predetermined delivery area that would prevent the MRU from accepting a delivery at the area of the identified obstacles; and use the identified obstacles to identify the set of grid cells. In this example, the one or more computing devices of the MRU are also configured to receive recipient preferences for the predetermined delivery area and to use the recipient preferences in order to identify the set of grid cells. In this example, the one or more computing devices of the MRU are configured to identify the set of grid cells by identifying a first set of grid cells using the identified obstacles and filtering the first set of grid cells to identify the set of grid cells.

In another example, the one or more computing devices are further configured to receive one or more recipient preferences for the predetermined delivery area and use the one or more recipient preferences to identify the common grid cell. In another example, the delivery system also includes a storage area for storing the MRU after a package is delivered to the MRU. In this example, the one or more computing devices of the MRU are further configured to maneuver the MRU to the storage area after a completed delivery and the storage area includes a sensor configured to identify when the MRU is located in the storage area. In addition or alternatively, the system also includes a notification device configured to provide a notification when the MRU is located in the storage area.

BRIEF DESCRIPTION OF THE DRAWINGS

FIGS. 3A-3E are example views of a mobile receptacle unit (MRU) in accordance with aspects of the disclosure.

DETAILED DESCRIPTION

Figure 1A:
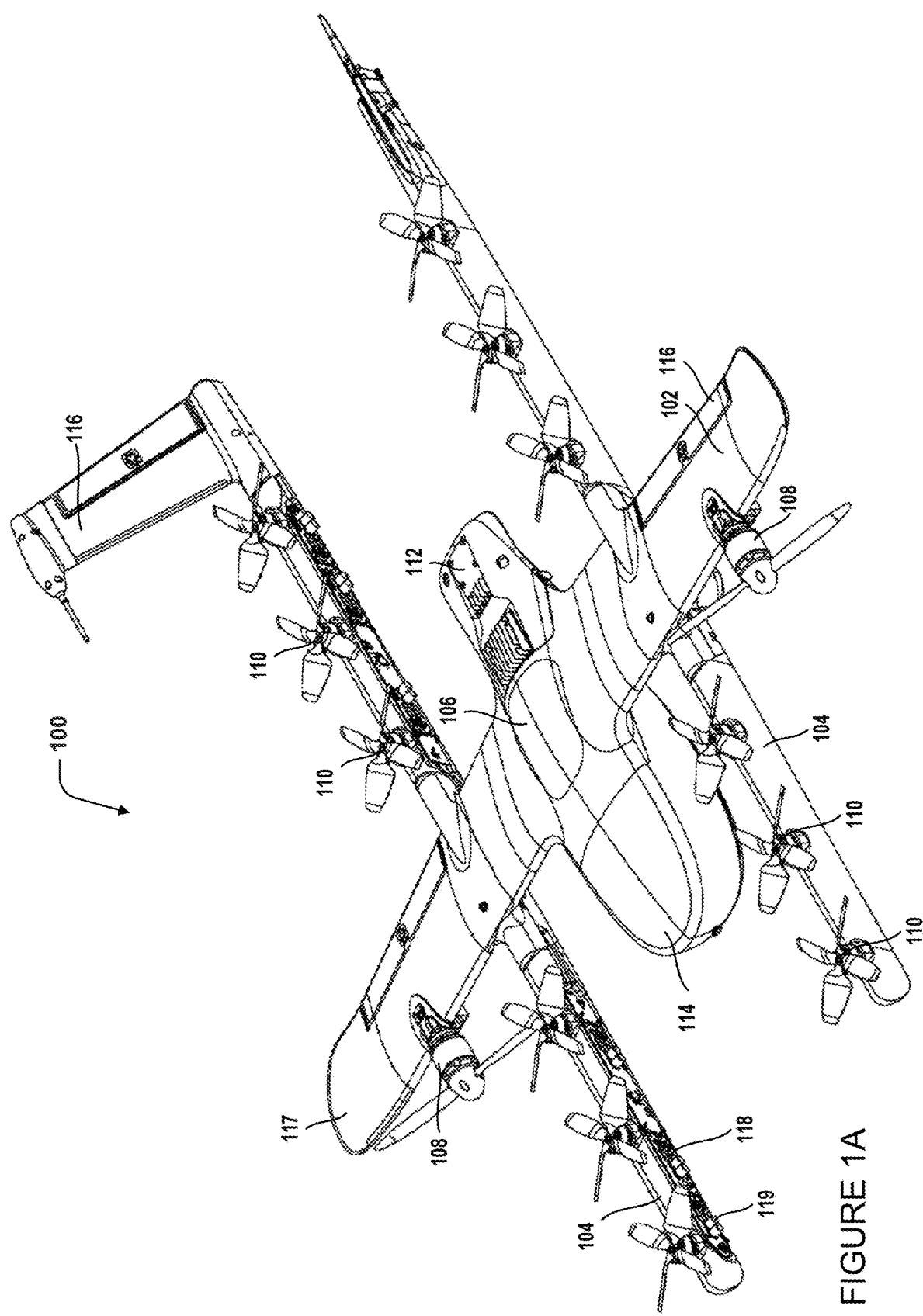
FIGS. 1A-1E are examples of UAVs in accordance with aspects of the present disclosure.

The technology relates to delivery systems involving the use of UAVs and other autonomous devices. As noted above, as UAV delivery becomes a reality, ensuring safe, secure and user-friendly deliveries will be a significant challenge. For instance, typical package delivery services include operators who are able and expected to make decisions about where to leave a package so it will be both safe and accessible by the recipient when the recipient is not available to accept the package. In the case of UAVs, the situation can be much more complicated as computers are not typically equipped with sufficed problem solving skills to address real-time delivery in areas that can change quite frequently. For instance, if a recipient designates a particular delivery area in a backyard, objects, such as trampolines, swing sets, ponds, pet kennels, debris, vehicles, pools, sheds, landscaping, bushes, trees, etc. can create obstacles for the UAV. In addition, the landscape of the backyard can change fairly frequently due to changing vegetation, moving of outdoor furniture, weather, etc. Moreover, recipients are unlikely to want to designate large areas of personal space for UAV delivery and may even want to keep UAVs as far from dwelling areas as possible for safety reasons.

A two-part delivery system, including both aerial and land-based mobile units, for instance a UAV and a land-based mobile receptacle unit (MRU), may be used to address many of these concerns without the need for a recipient to be present to accept a package delivery. The aerial-based unit may correspond to an aerial UAV which includes one or more control computing devices as well as other features to allow the UAV to fly in different directions. The MRU may also include one or more control computing devices as well as other features that will allow the MRU to maneuver itself safely. The MRU may provide a receptacle area for accepting packages. The receptacle area may include a pressure sensor or switch to allow the computing device of the MRU to confirm that a package was received in the receptacle area.

Before a package can be delivered, a recipient (or another operator) may set up a delivery area using a map via an application for the delivery system on a computing device. The map may be converted to a grid including a plurality of cells each having a respective identifier. Each cell may be sized to correspond to an acceptable delivery area. The recipient may designate specific grid cells as appropriate or not appropriate for delivery. In addition, the recipient may designate a storage area where the MRU is able to securely park itself once a package has been delivered by the UAV. Once the storage area is designated, the recipient may place the MRU at the storage area and allowing the MRU to move through the space around area. This movement may allow the MRU to identify grid cells of the map through which the MRU is able to maneuver and/or accept packages.

Once a delivery is going to occur, one or more backend server computing devices may dispatch the UAV. The UAV may also be provided with the map identifying grid cells which are appropriate or not appropriate for delivery as well as any other preferences identified by the recipient. The backend server computing devices may also send a notification to the recipient via the application and/or the MRU. This may allow the recipient to place the MRU outside or in an appropriate location and/or allow the MRU to maneuver itself to an appropriate location. The computing devices of the MRU may also identify grid cells appropriate for a delivery.

As the UAV approaches the delivery area, the UAV may capture sensor data for the delivery area. At the same time, the UAV's computing devices may attempt to communicate with the MRU, for instance, via a wireless network. In response, the MRU may send the identifiers for the identified grid cells appropriate for delivery with the UAV. The UAV's computing devices may then compare the grid cells identified by the UAV's computing devices with those identified by the MRU to identify a common grid cell for the delivery.

Once a grid cell for the delivery has been identified, this corresponding identifier for that grid cell may be sent to the computing devices of the MRU. In response to receiving the identifier, the MRU may maneuver itself to the location of the grid cell corresponding to the received identifier. After the location is reached, the MRU may open to prepare for the delivery, and the MRU may send a notification to the UAV indicating that the MRU is ready for the delivery. Once the UAV has maneuvered itself in place for the delivery, the UAV may attempt to complete the delivery and thereafter maneuver the UAV to another location. After the delivery is completed, the MRU may maneuver itself to the storage area, sending a notification indicating that a package has been delivered and that the package is located in the storage area.

The features described herein may allow for affecting UAV delivery services in real time while ensuring safety and considering delivery requirements and preferences of a recipient. In other words, communications between the MRU and the UAV allow for efficient and hassle free delivery solutions even in changing circumstances. As such, the recipient is able to devote the least amount of energy, time and attention to receiving packages, does not need to be present to receive a delivery, does not need to be near a UAV during delivery, and can be assured that their package is safe, secure, and will not be left in a random location.

Aspects, features and advantages of the disclosure will be appreciated when considered with reference to the foregoing description of embodiments and accompanying figures. The same reference numbers in different drawings may identify the same or similar elements. Furthermore, the following description is not limiting; the scope of the present technology is defined by the appended claims and equivalents.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling a payload or package. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. In addition, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, hook and loop fasteners etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
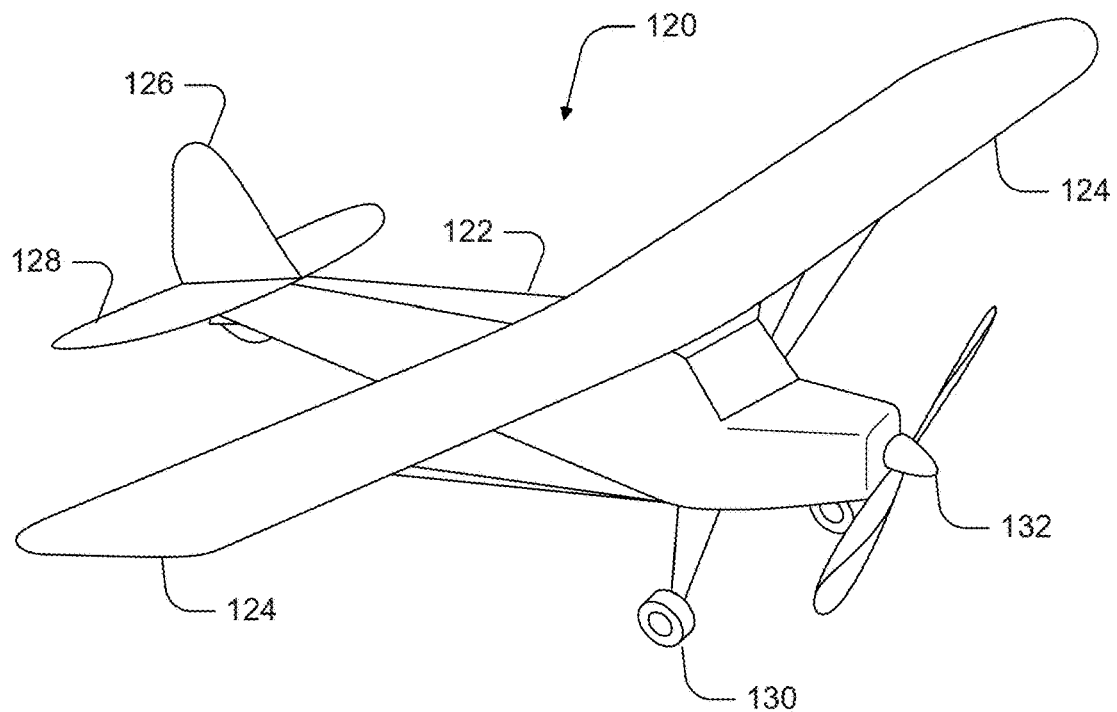

Similarly, FIG. 1B shows another example of a UAV 120. The UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
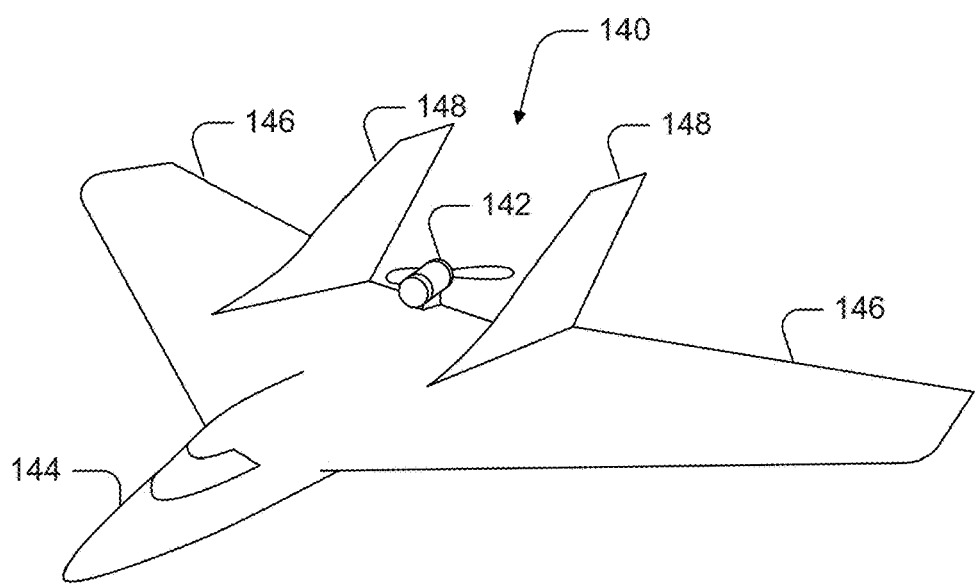

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
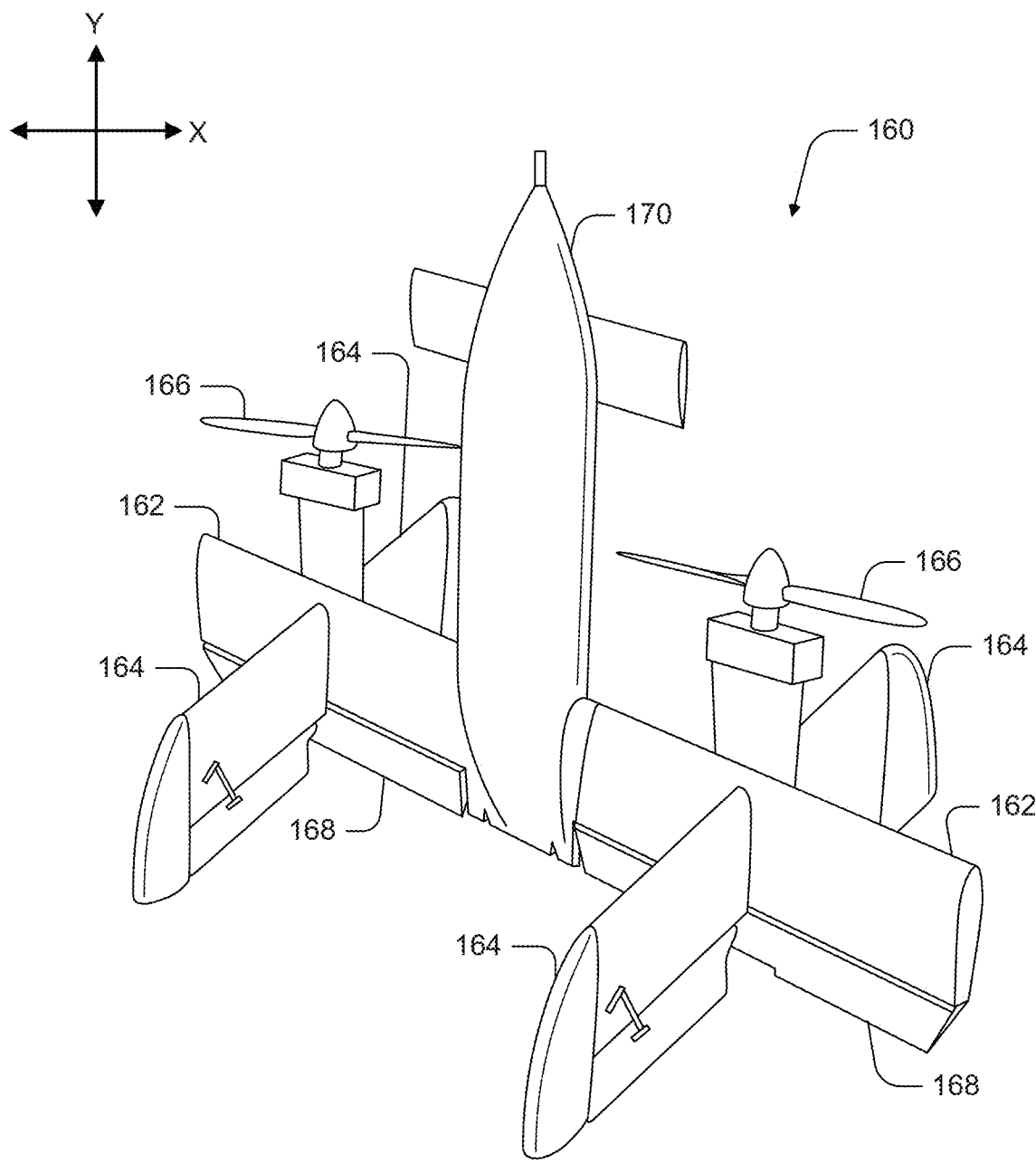

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own. For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Figure 1E:
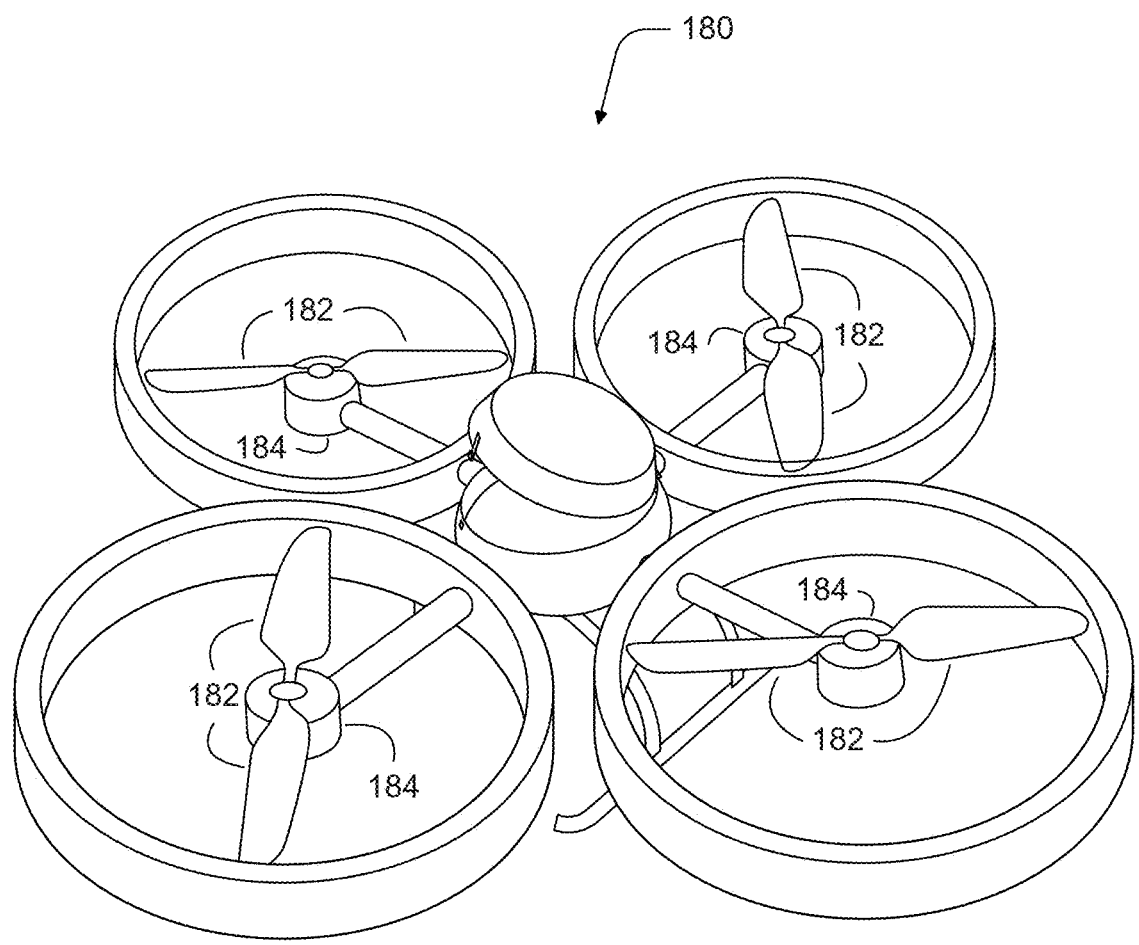

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible. As noted above, some embodiments may involve other types of UAVs, in addition to or in the alternative to fixed-wing UAVs. For instance, FIG. 1E shows an example of a rotorcraft that is commonly referred to as a multicopter UAV 180. The UAV 180 may also be referred to as a quadcopter, as it includes four rotors 182. It should be understood that example embodiments may involve a rotorcraft with more or fewer rotors than the UAV 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the UAV 180 in greater detail, the four rotors 182 provide propulsion and maneuverability for the UAV 180. More specifically, each rotor 182 includes blades that are attached to a motor 184. Configured as such, the rotors 182 may allow the UAV 180 to take off and land vertically, to maneuver in any direction, and/or to hover. Further, the pitch of the blades may be adjusted as a group and/or differentially, and may allow the UAV 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the various UAVs described herein are not intended to be limiting. Example embodiments may relate to, be implemented within, or take the form of any type of unmanned aerial vehicle.

Figure 2:
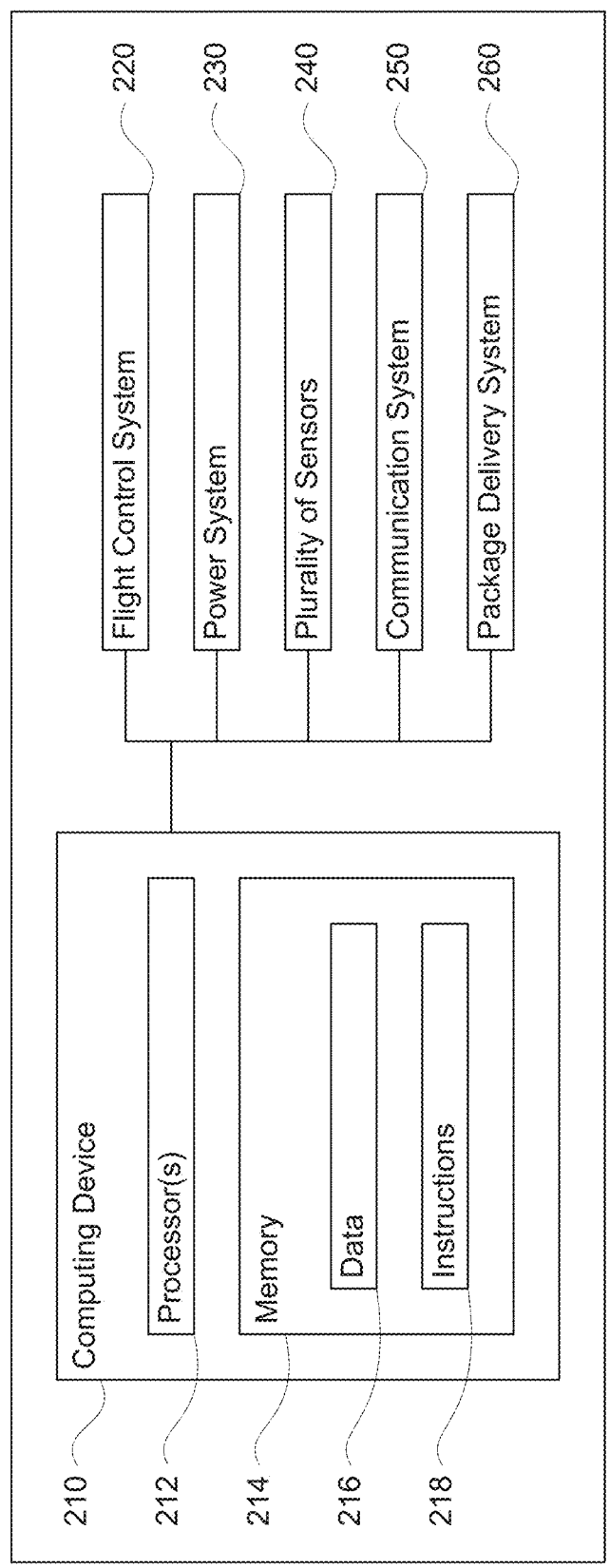
FIG. 2 is an example functional diagram of a UAV in accordance with aspects of the disclosure.

FIG. 2 is an example functional diagram of a UAV 200 which may correspond to any of the UAVs of a fleet, group, or plurality of UAVs, including any of UAVs 100, 120, 140, 160, 180. In this example, the UAV 200 includes one or more computing devices 210 including one or more processors 212 and memory 214 storing data 216 and instructions 218. Such processors, memories, data and instructions may be configured similarly to one or more processors 512, memory 514, data 516, and instructions 518 of computing devices 510 discussed further below. In addition, the UAV 200 includes a flight control system 220, a power system 230, a plurality of sensors 240, a communication system 250, and a package delivery system 260.

For any of the aforementioned example configurations of UAVs, each of the features of the motors, shafts, propellers, rotors, flaps, etc. may all be part of the flight control system 220. Operation of the flight control system 220 may be controlled by the computing devices 210 in order to maneuver the UAV 200, for instance, by controlling the altitude, pitch, speed, direction, etc. of the UAV.

The power system 230 may include at least one battery which can provide current to a motor in order to rotate a shaft for a propeller or pivot one or more flaps. Of course, two or more batteries may be useful in the event of an unexpected failure of one battery or to be able to increase the power to the motor or motors for short periods of time in order to accomplish the aforementioned flying maneuvers.

The plurality of sensors 240 may be located throughout the UAV 200 in order to generate data or sensor feedback from different locations and features of the UAV and forward this information to the computing devices 210. In this regard, sensor feedback may refer to "raw sensor data" or data processed by the sensor or computing devices 210. The plurality of sensors 240 may include sensors such as LIDAR, sonar, radar, cameras (still and/or video) which may include, e.g., optical or infrared imaging devices, an altimeter, an accelerometer, a gyroscope, GPS receiver, a humidity sensor, a speedometer, a wind speed sensor, propeller speed sensors (relative and absolute), etc. in order to enable the UAV to safely maneuver itself and to determine how and where to deliver a package. Thus, sensor feedback may include information generated by all or any of the plurality of sensors 240.

The computing devices 210 may be configured to control the operation of the various systems of the UAV 200 in order to function as described herein. For instance, the computing devices 210 may use the data and instructions of memory 214 as well as feedback from some of the sensors to control the features of the flight control system 220 and power system 230 in order to follow a flight plan and deliver a package. In this regard, the instructions may allow the UAV 200 to operate autonomously or semi-autonomously using aerial maps and mission information stored the data of memory 214.

The communication system 250 may include for instance, a network interface device, such as a transmitter and/or receiver which enables the UAV to communicate with other computing devices, such as computing devices 510, MRU 300, and/or other computing devices via a network, such as network 550 of FIGS. 5A-B, which are discussed in detail below.

The package delivery system 260 may allow the UAV to physically complete delivery of a package. For instance, the package delivery system may include a winch, a cable, and a grabbing mechanism in order to grab, lift, lower, and release a package.

FIGS. 3A, 3B, 3C, 3D and 3E depict views of an example MRU 300, although other configurations may also be employed. MRU 300 may be generally circular in shape. Swivel wheels 310 and 312, as shown in the side view of FIG. 3A, or located on a bottom surface 314 of the MRU 300, may allow the MRU to move and rotate in different directions. The MRU may also include a receptacle area 320 for accepting packages as shown in the partially transparent side view of FIG. 3B. For reference, a package 330 is shown in receptacle area 320 in FIG. 3B. In addition, the receptacle area 320 may include a sensor 322 to allow a computing device of the MRU to confirm that a package was received in the receptacle area.

Figure 3E:
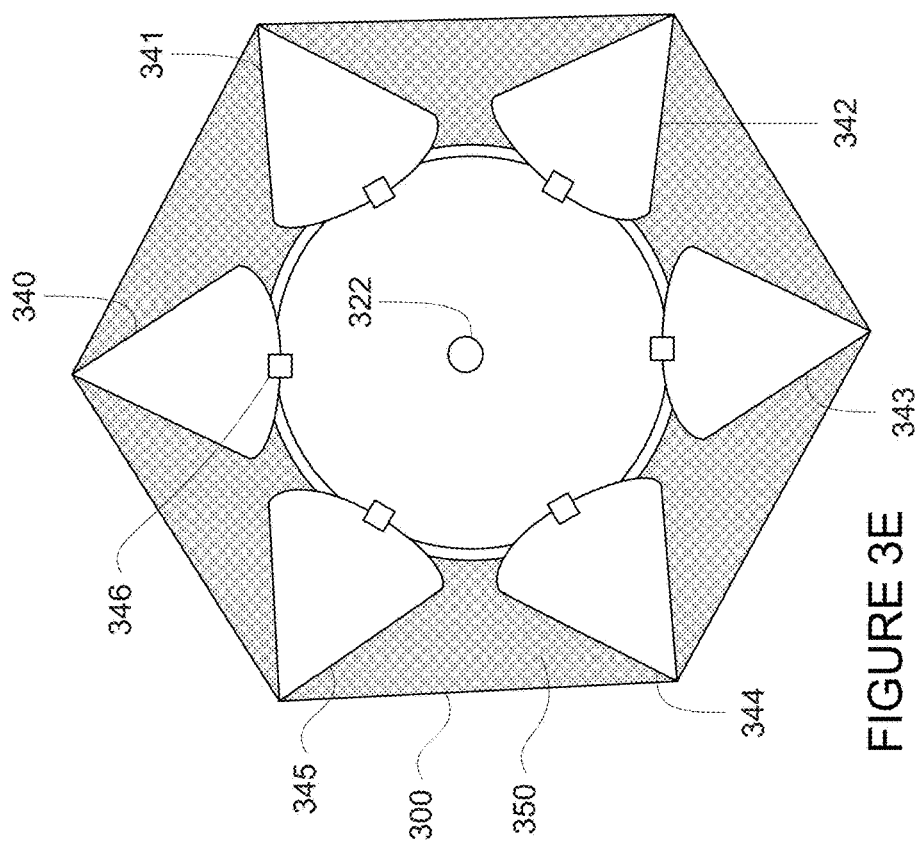
Figure 3D:
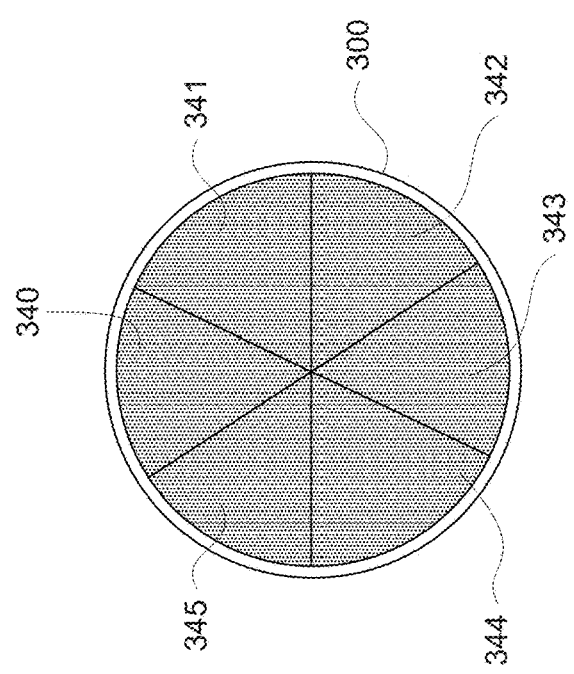

A top surface 316 of the MRU may include a plurality of hinged panels 340-345 that can pivot open to reveal the receptacle area and closed to cover the receptacle area. In this regard, each hinged panel may include a hinge 346 to allow for this pivoting motion. Although six hinged panels are show, any number of hinged panels or other structures, such as 1, 2, 8 or more or less may be used to open and close the top surface 314 of the MRU 300 in order to accept packages. FIG. 3C depicts a top down view of the MRU 300 with the hinged panels in a closed condition (such that the hinged panels are below a mesh material 350 represented by the shaded areas in FIGS. 3C-3E and discussed further below), FIG. 3D depicts a side view of the MRU while the hinged panels are in a closed condition (such that the hinged panels are behind the mesh material 350), and FIG. 3E depicts a top down view of the MRU with the hinged panels in the open condition.

Between, or surrounding and connecting, the hinged panels may be a stretchable mesh material 350 in order to increase a likelihood of a package reaching the receptacle area 320. The mesh material may be selected to be somewhat resilient (for instance, flexible while maintaining its shape), as well as durable, with high heat tolerance, and preferably low cost. As an example, the mesh material may be made of polyester, plastics, or other such materials suitable for mesh netting. The mesh material may increase the likelihood of a package making it into the receptacle area 320 by increasing the surface area where the package is "caught" by the hinged panels and thereby negating the effects of wind and the need for high-precision positioning of the package on the MRU. For instance, the angular position of each of the hinged panels 340-345 when fully extended to receive a package may form a sloping angle, or an angle of less than 180 degrees relative to the top surface 314 of the MRU. As such, if a package where to contact the mesh material and/or the panels, the sloping angle combined with gravity would guide the package downward and into the receptacle area 320.

Figure 4:
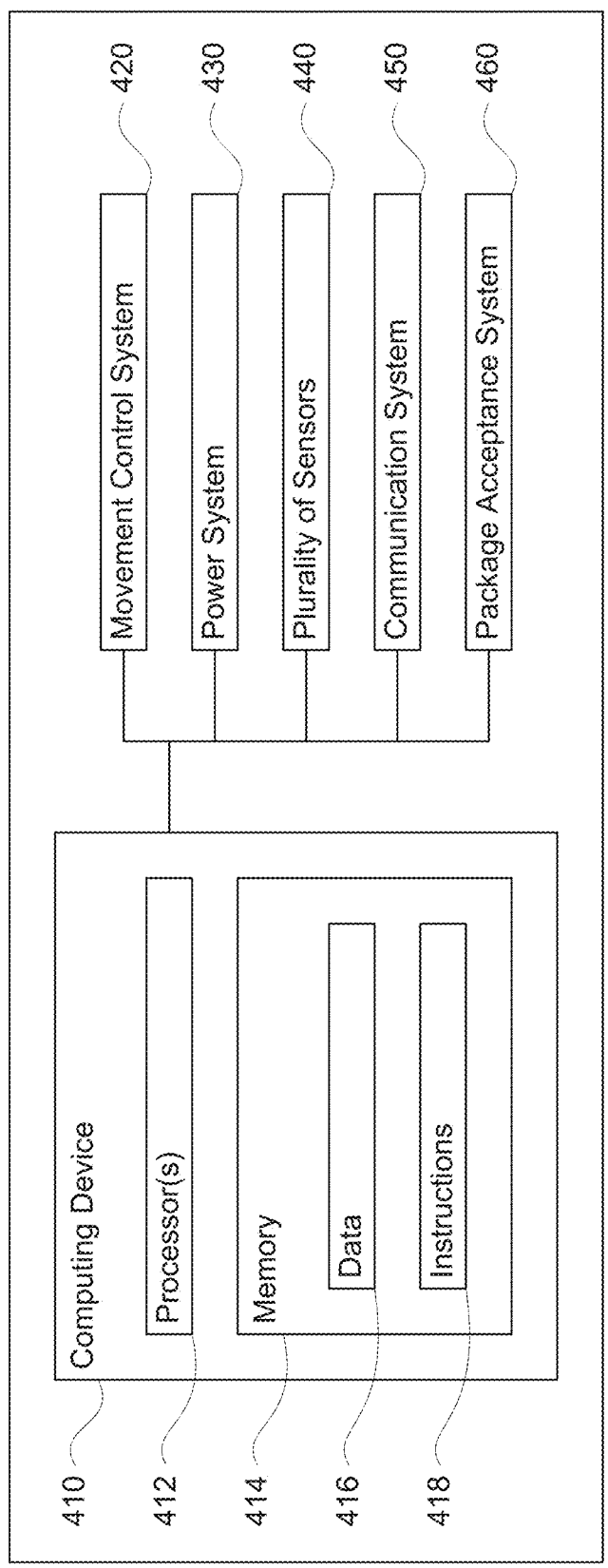
FIG. 4 is an example functional diagram of an MRU in accordance with aspects of the disclosure.

FIG. 4 is an example functional diagram of the MRU 300. In this example, the MRU 300 includes one or more computing devices 410 including one or more processors 412 and memory 414 storing data 416 and instructions 418. computing devices 410. Such processors, memories, data and instructions may be configured similarly to one or more processors 512, memory 514, data 516, and instructions 518 of computing devices 510 discussed further below. In addition, the MRU 300 includes a movement control system 420, a power system 430, a plurality of sensors 440, a communication system 450, and a package acceptance system 460.

The movement control system 420 may include one or more wheels or tracks, motors, and steering features in order to allow the MRU to move around. Operation of the movement control system 420 may be controlled by the computing devices 410 in order to maneuver the MRU 300, for instance, by controlling speed, heading, acceleration and deceleration. The power system 430 may include at least one battery which can provide current to the motor in order to control the movement of the MRU 300.

The plurality of sensors 440 may be located throughout the MRU 300 in order to generate data or sensor feedback from different locations and features of the MRU and forward this information to the computing devices 410. Again, sensor feedback may refer to "raw sensor data" or data processed by the sensor or computing devices 410. The plurality of sensors 440 may include sensors such as LIDAR, sonar, radar, cameras (still and/or video), anemometer, accelerometer, gyroscope, GPS receiver, and speedometer, etc. in order to enable the MRU 300 to safely maneuver itself and to determine how and where to accept a package. Thus, sensor feedback may include information generated by all or any of the plurality of sensors 440. While the sensors of the MRU may also include LIDAR, sonar, radar, cameras (still and/or video) to detect and identify obstacles, radar units may be sufficient to allow the MRU to detect obstacles while keeping costs of the MRU down.

The computing devices 410 may be configured to control the operation of the various systems of the MRU 300 in order to function as described herein. For instance, the computing devices 410 may use the data and instructions of memory 414 as well as feedback from some of the sensors to control the features of the movement control system 420 and power system 430 in order to follow maneuver the MRU in different directions. In this regard, the instructions may allow the UAV 200 to operate and recharge autonomously using maps and other information stored the data of memory 414.

The communication system 450 may include for instance, a network interface device, such as a transmitter and/or receiver which enables the UAV to communicate with other computing devices, such as computing devices 510, UAV 200, and/or other computing devices via a network, such as network 550 discussed further below.

The package acceptance system 460 may allow the MRU to physically accept delivery of a package. For instance, the package delivery system may include the receptacle area 320 for accepting packages. As noted above, the receptacle area 320 may include a sensor 322 such as a pressure sensor or switch to allow the computing devices 410 of the MRU 300 to confirm that a package was received in the receptacle area.

Figure 5A:
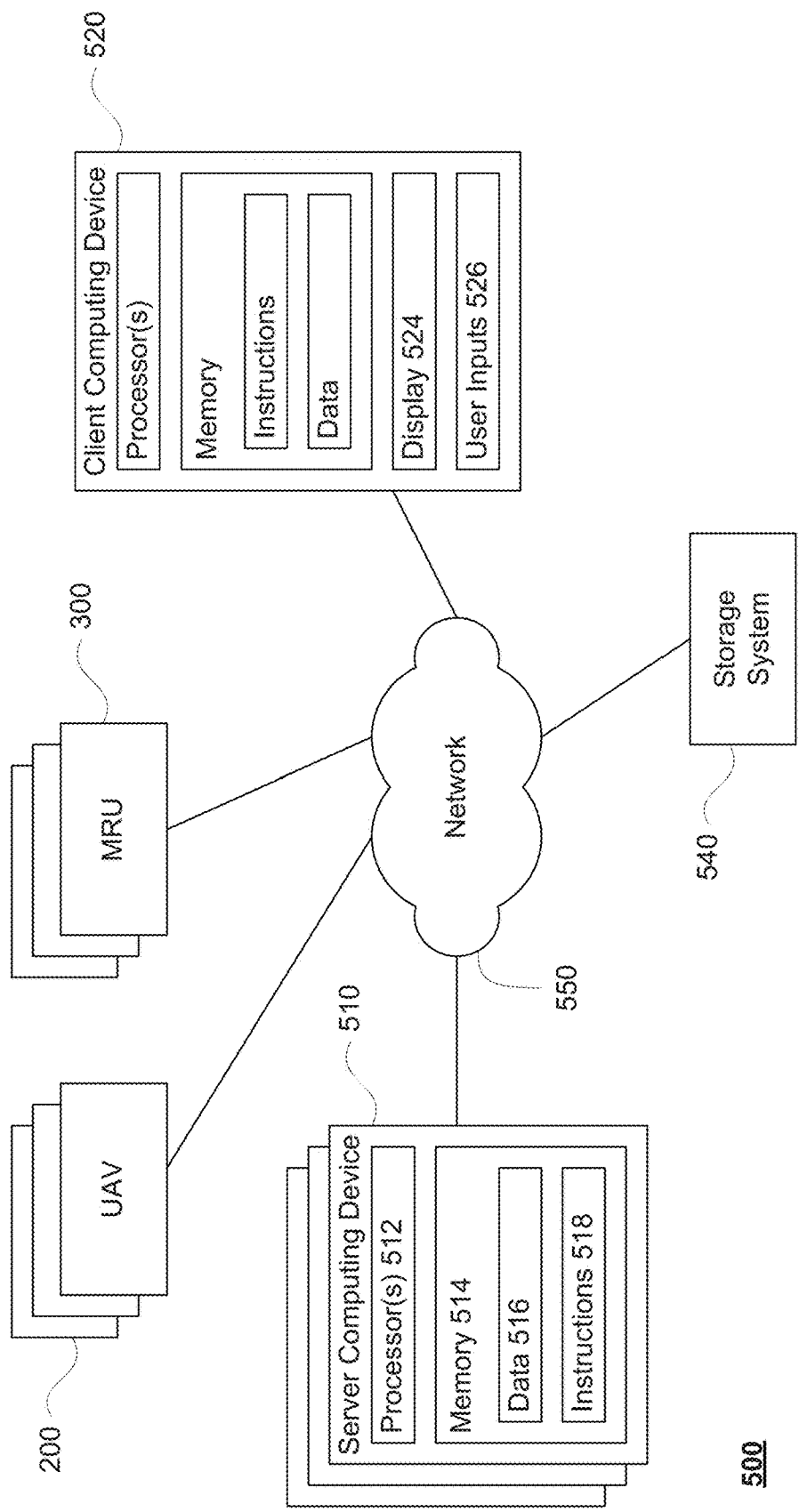
FIG. 5A is an example functional diagram of a management system for a group of UAVs in accordance with aspects of the disclosure.
Figure 5B:
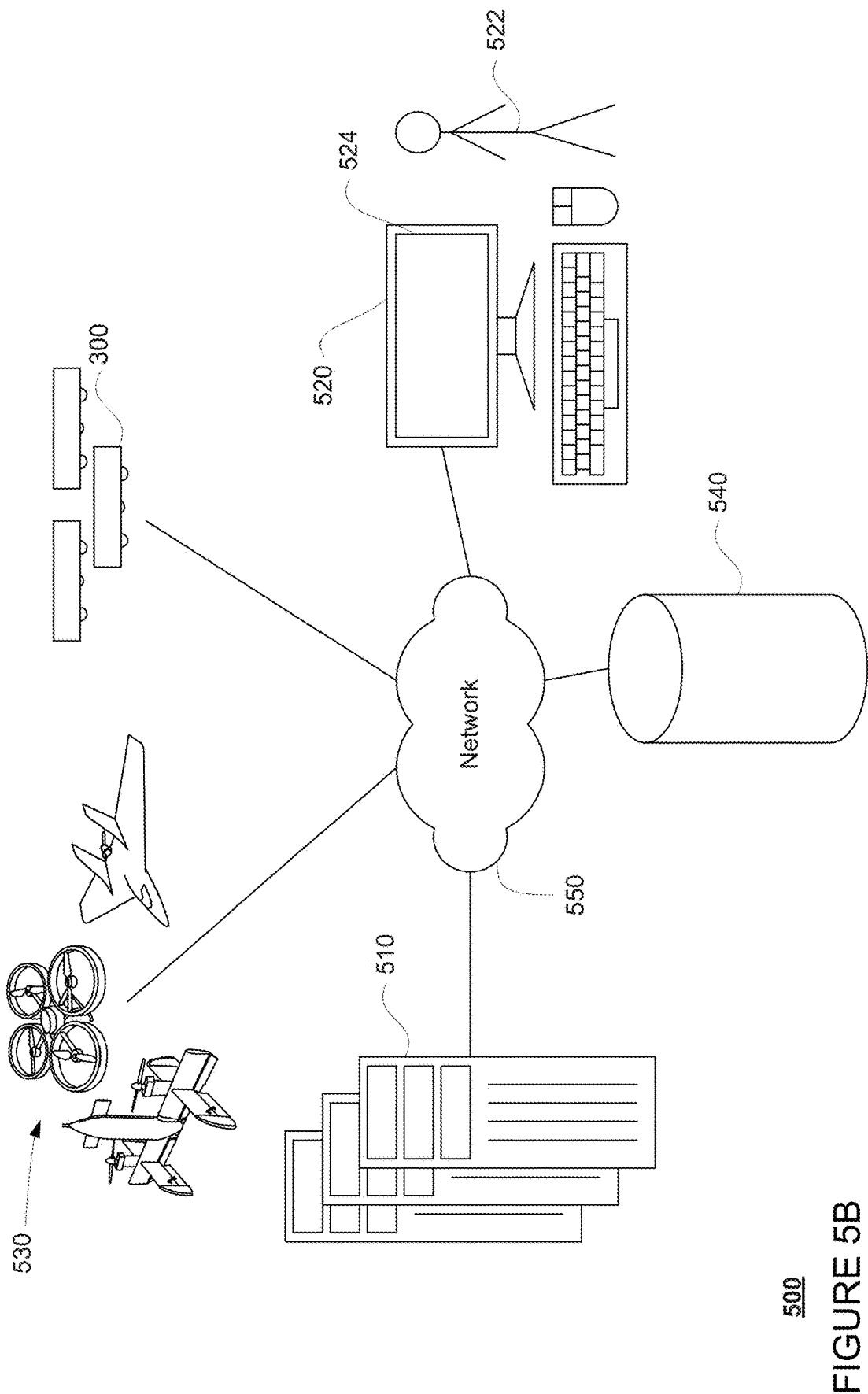
FIG. 5B is an example pictorial diagram of a management system for a group of UAVs in accordance with aspects of the disclosure.

FIGS. 5A and 5B are functional and pictorial diagrams, respectively, of an example management system 500 for a group of UAVs. The management system 500 includes computing devices 510, 520, a group 530 of UAVs, here UAVs 200, a plurality of the MRUs 300, and a storage system 540 connected via a network 550. Although only a few UAVs, MRUs, and computing devices are depicted for simplicity, a typical system may include significantly more, e.g., dozens or hundreds.

Computing devices 510 include one or more processors 512, memory 514, and other components typically present in general purpose computing devices. The memory 514 stores information accessible by the processor 512, including instructions 516 and data 518 that may be executed or otherwise used by the processor 512. The memory 514 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 516 may be any set of instructions to be executed directly (such as machine code) or indirectly (such as scripts) by the processor. For example, the instructions may be stored as computing devices code on the computing device-readable medium. In that regard, the terms "instructions" and "programs" may be used interchangeably herein. The instructions may be stored in object code format for direct processing by the processor, or in any other computing devices language including scripts or collections of independent source code modules that are interpreted on demand or compiled in advance. Functions, methods and routines of the instructions are explained in more detail below.

The data 518 may be retrieved, stored or modified by processor 512 in accordance with the instructions 516. For instance, although the claimed subject matter is not limited by any particular data structure, the data may be stored in computing devices registers, in a relational database as a table having a plurality of different fields and records, XML documents or flat files. The data may also be formatted in any computing device-readable format.

The processor 512 may be any conventional processors, such as commercially available CPUs. Alternatively, the one or more processors may be a dedicated device such as an ASIC or other hardware-based processor. Although FIG. 5A functionally illustrates the processor, memory, and other elements of computing devices 510 as being within the same block, it will be understood that the processor, computing device, or memory may actually include multiple processors, computing devices, or memories that may or may not be stored within the same physical housing. For example, memory may be a hard drive or other storage media located in a housing different from that of computing devices 510. Accordingly, references to a processor or computing devices will be understood to include references to a collection of processors or computing devices or memories that may or may not operate in parallel.

Computing devices 510 may also include one or more wireless network connections to facilitate communication with other computing devices, such as the client computing device 520, the computing devices 210 of the UAVs of the group as well as the computing devices 410 of the MRUs. As an example, the computing devices 510 may receive information from the UAVs of the group and send instructions to the UAVs as discussed further below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The network 550, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 510 may include one or more server computing devices having a plurality of computing devices, e.g., a load balanced server farm, that exchange information with different nodes of a network for the purpose of receiving, processing and transmitting the data to and from other computing devices. For instance, one or more computing devices 510 may include one or more server computing devices that are capable of communicating with the computing device 520 as well as computing devices of group of UAVs 530 via the network 550. For example, any of UAVs 100, 120, 140, 160, 180 (FIGS. 1A-1E) may be a part of the group of UAVs 530, the operation of which may be determined and controlled by the server computing devices. In this regard, the server computing devices 510 may function as a management system for the group of UAVs.

As such, the server computing devices 510 may be configured to generate and assign missions to the group of UAVs 530. Each mission may include a flight plan may include a path identifying where the UAV should fly as well as corresponding maneuvers, such as changing directions, hovering, etc. Each mission may also include one or more tasks, such as picking up or delivering payloads or packages. In addition, the UAVs of the group of UAVs may periodically send the server computing devices information relating to the status of the UAVs discussed further below, and the one or more server computing devices may use to update or change the information of the storage system 540.

In addition, server computing devices 510 may use network 550 to transmit and present information to a operator, such as operator 522 on a display, such as displays 524 of computing device 520. In this regard, computing device 520 may be considered client computing device. Again, although only a single client computing devices is shown, the system 500 may include many more.

As shown in FIG. 5B, client computing device 520 may be a personal computing devices intended for use by a operator 522 and have all of the components normally used in connection with a personal computing devices including one or more processors (e.g., a central processing unit (CPU)), memory (e.g., RAM and internal hard drives) storing data and instructions, a display such as display 524 (e.g., a monitor having a screen, a touch-screen, a projector, a television, or other device that is operable to display information), user inputs 526 (e.g., a mouse, keyboard, touchscreen or microphone), speakers, a network interface device, and all of the components used for connecting these elements to one another. In some examples, client computing device 520 may be a work station used by an administrator or operator to access and/or manipulate information for the group of UAVs 530. Again, such processors, memories, data and instructions of the client computing device 520 may be configured similarly to one or more processors 512, memory 514, instructions 516, and data 518 of computing devices 510.

Although the client computing device 520 may be a full-sized personal computing device, it may alternatively be a mobile computing device capable of wirelessly exchanging data with a server over a network such as the Internet. By way of example only, client computing device 520 may be a mobile phone or a device such as a wireless-enabled PDA or cellular phone, a tablet PC, a wearable computing device or system, or a netbook that is capable of obtaining information via the Internet or other networks. In another example, client computing device 520 may be a wearable computing system, such as a wristwatch or head-mounted computer. As an example the user may input information using a small keyboard, a keypad, microphone, using visual signals with a camera, or a touch screen.

As with memory 514, storage system 540 can be of any type of computerized storage capable of storing information accessible by the server computing devices 510, such as a hard-drive, memory card, ROM, RAM, DVD, CD-ROM, write-capable, and read-only memories. In addition, storage system 540 may include a distributed storage system where data is stored on a plurality of different storage devices which may be physically located at the same or different geographic locations. Storage system 540 may be connected to the computing devices via the network 550 as shown in FIGS. 5A-5B, and/or may be directly connected to or incorporated into any of the computing devices 510 or 520 or the computing devices of the group of UAVs 530.

Storage system 540 may store various types of information as described in more detail below. This information may be retrieved or otherwise accessed by a server computing device, such as one or more server computing devices 510, in order to perform some or all of the features described herein. For instance, the storage system 540 may store data, such as status information for each UAV of the group of UAVs, aerial maps, outstanding deliveries (i.e., package locations and destinations), recipient preferences, and maps and/or grids as discussed further below that can be used to coordinate deliveries.

Figure 10A:
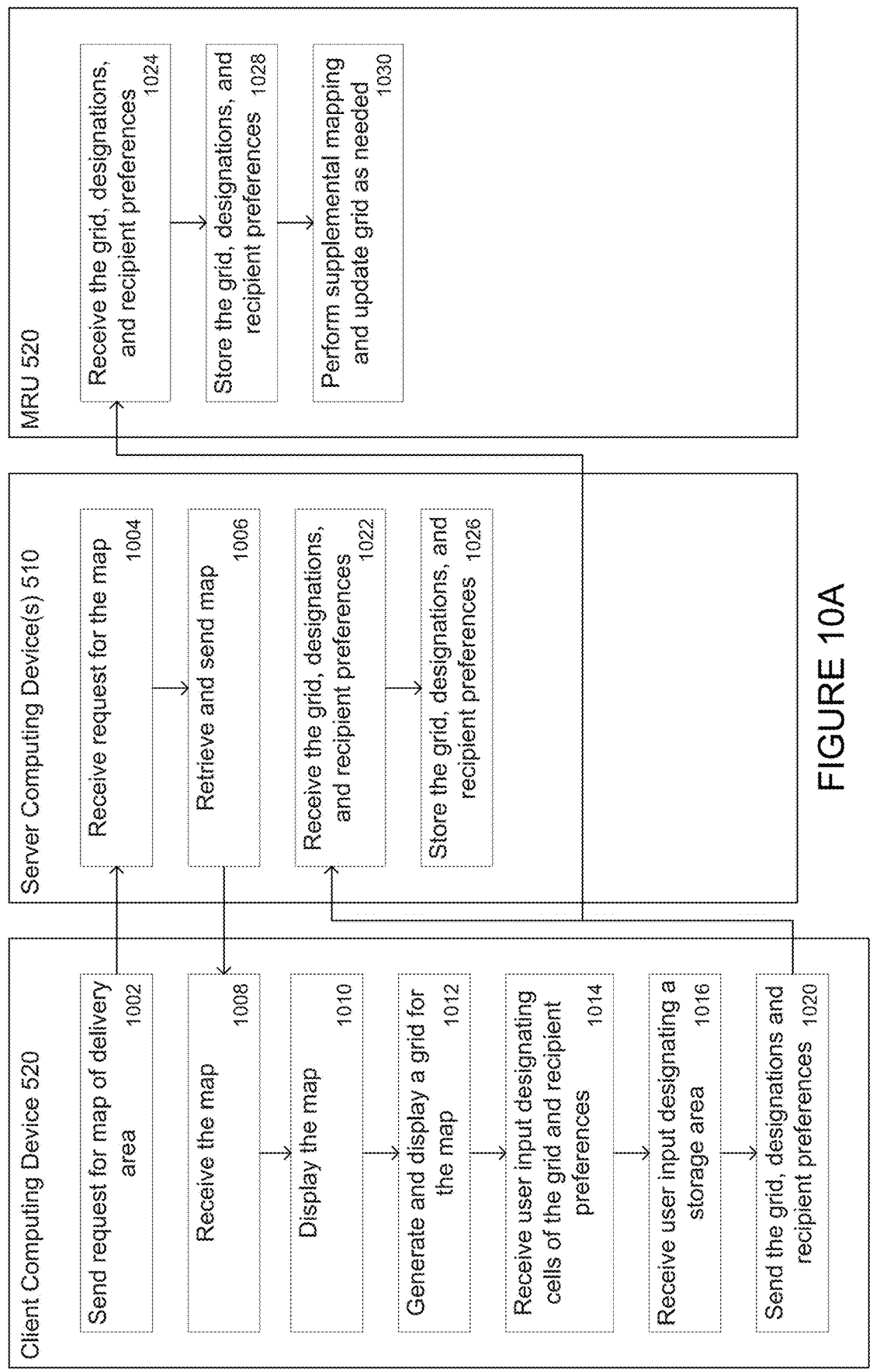
FIGS. 10A-10C are an example flow diagram in accordance with aspects of the disclosure.
Figure 10B:
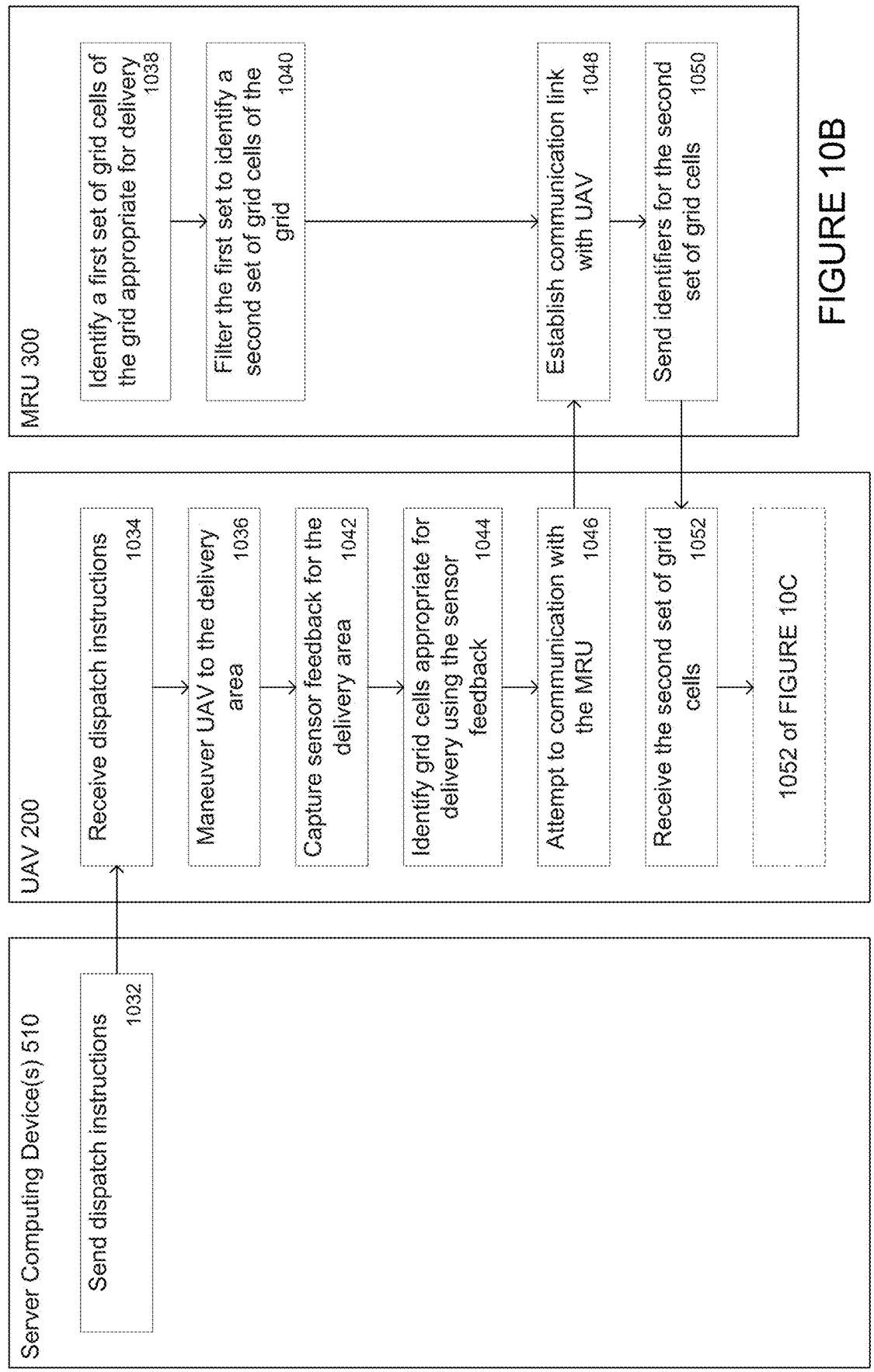
Figure 10C:
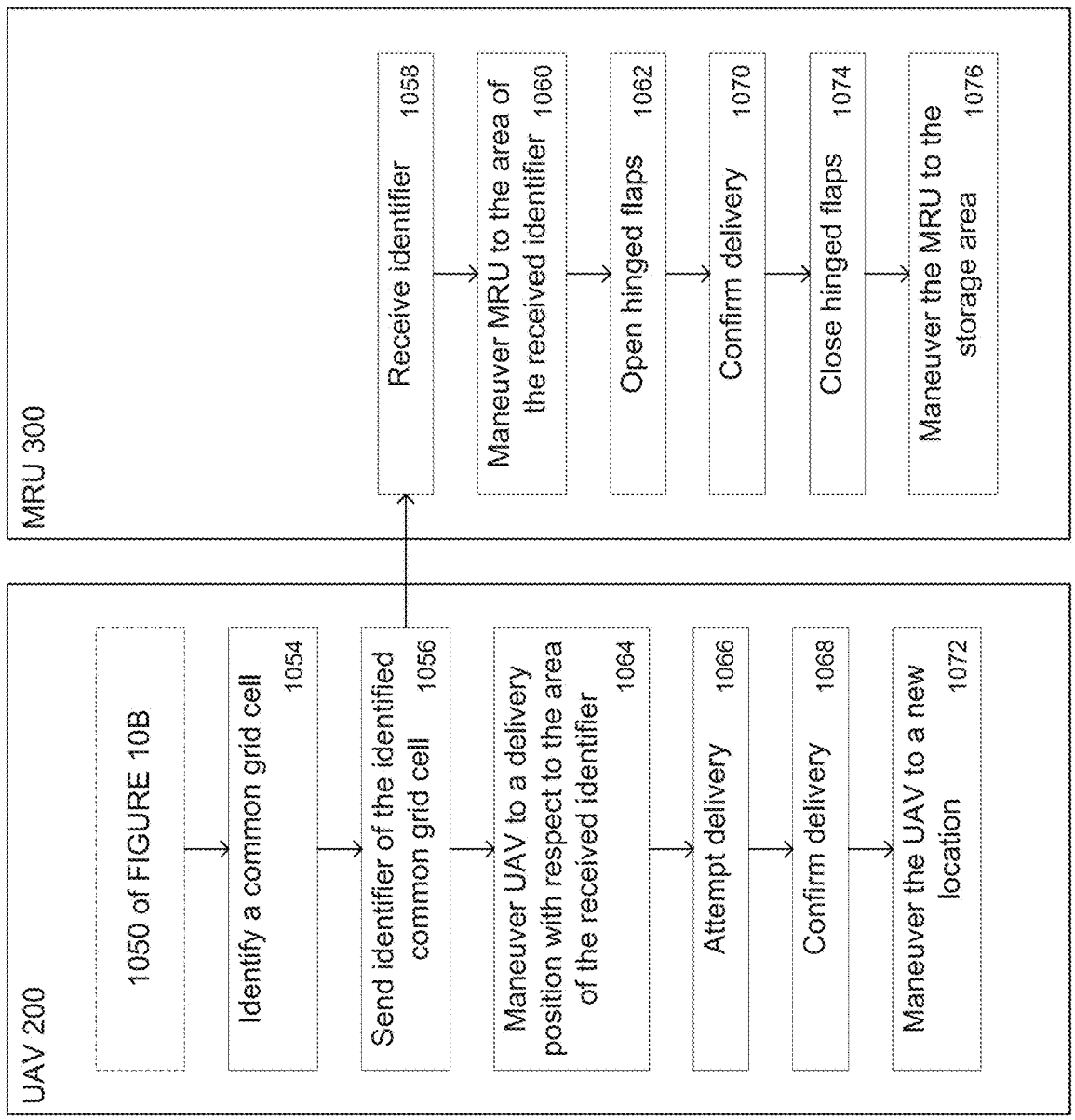

FIGS. 10A-10C are example flow diagrams of aspects of the disclosure discussed further below. As shown in the flow diagram, the operations of the blocks may be performed by one or more processors of one or more computing devices, including, for instances, the computing devices 210, the computing devices 410, server computing devices 510, and client computing device 520. In addition, various of the the operations may be performed at the same time or in a different order.

Before a package can be delivered, a recipient (or another operator) may set up a delivery area using a map via an application for the delivery system on a computing device. Thus, the delivery areas for recipients at particular addresses or locations may be pre-determined. For instance, the operator 522 may use the computing device 520 to download an application. Thereafter, the operator 522 may access the application in order to view a map of a delivery area for the operator. For instance, as shown in block 1002 of FIG. 10A, the client computing device 520 may request a map of the delivery area from the server computing devices 510. For instance, the request may include information identify an address or geographic area corresponding to the delivery area. The server computing devices may receive the request, retrieve the map from storage system 540 using the information in the request, and provide the map to the client computing device at blocks 1504 and 1506. Then at blocks 1508 and 1510, the client computing device 520 may receive and display the map, such as the map 600 of FIG. 6, on the display 524 of the client computing device 520.

Figure 6:
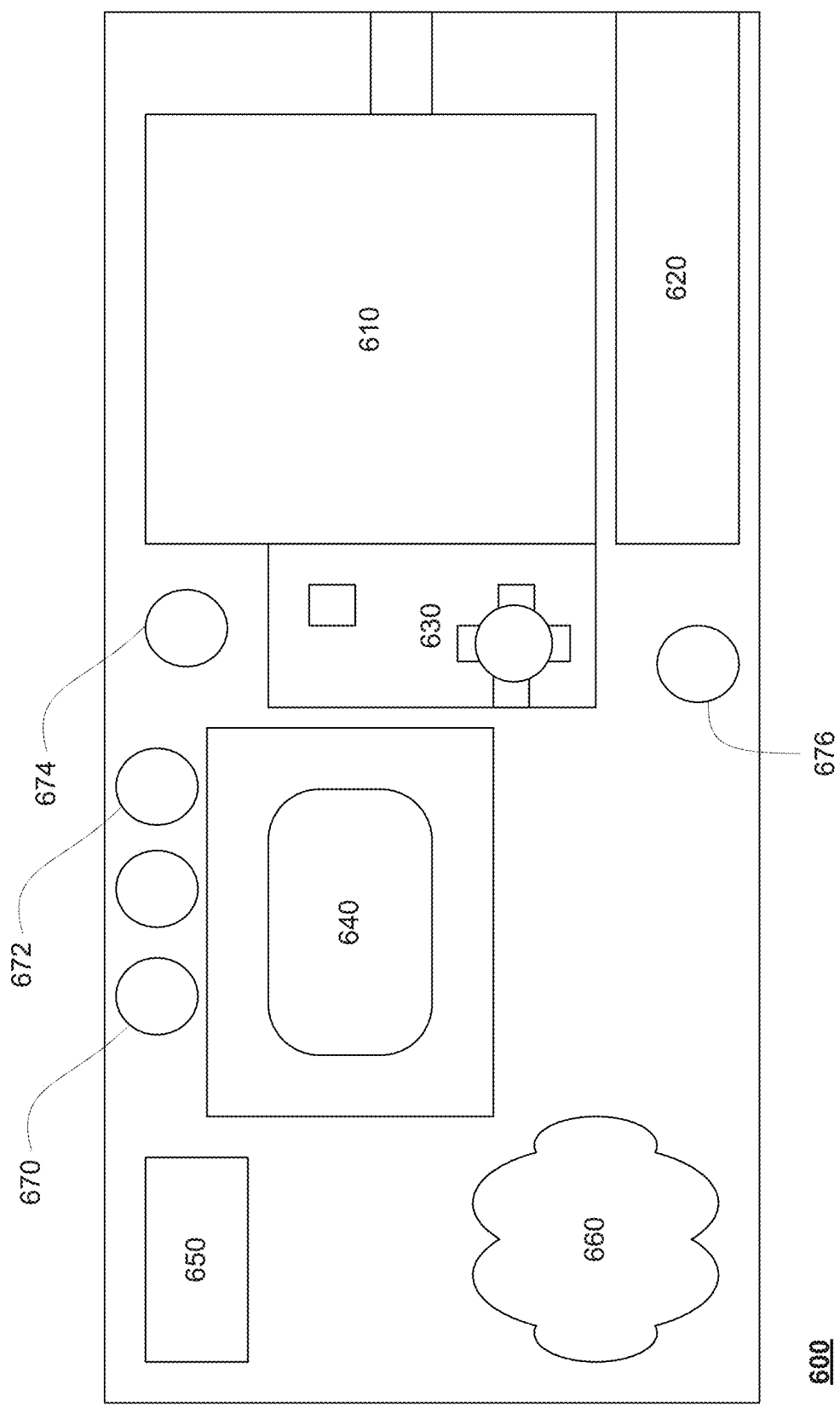
FIG. 6 is an example representation of a map in accordance with aspects of the disclosure.

Turning to FIG. 6, the map 600 includes a view of a residential home 610, a driveway 620, a patio 630, a pool 640, a shed 650, a tree 660 as well as a plurality of shrubs 670, 672, 674, 676 or other vegetation. As shown in the example of FIG. 6, the map 600 may be an aerial map of the delivery area, such as those available from typical mapping services. Alternatively, the map may be a map generated by allowing an MRU, such as MRU 300, to maneuver itself around the delivery zone (e.g., the recipient's back yard) or a series of satellite or aerial images captured by a UAV, such as UAV 200, flying over the area using a camera of the plurality of sensors 240.

Figure 7A:
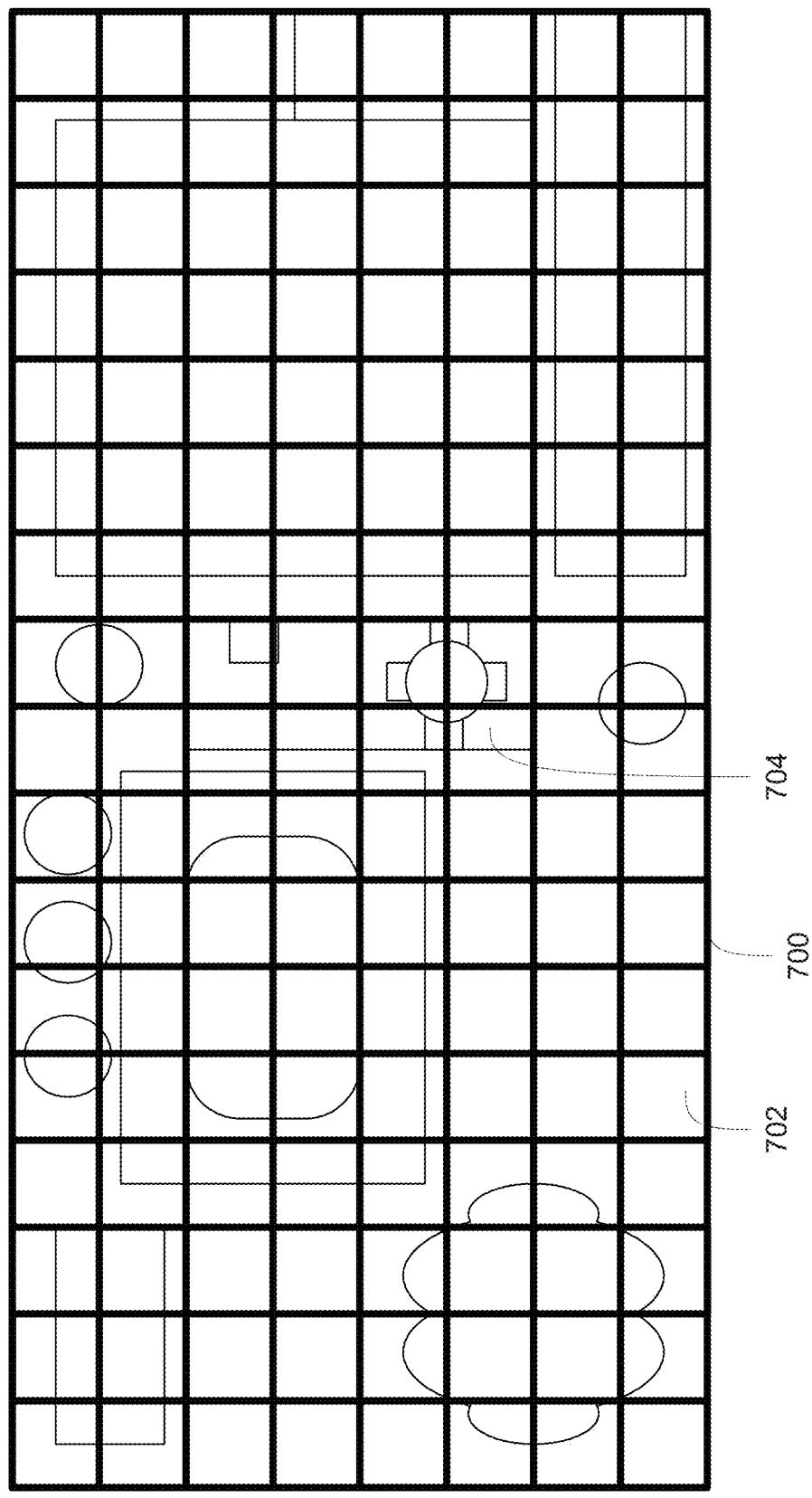
FIG. 7A-7F are examples of grids in accordance with aspects of the disclosure.

As shown in block 1012 of FIG. 10A, client computing device 520 (and/or the server computing device 510) may add, generate, or otherwise convert the map to a grid including a plurality of cells and display the grid. For instance, FIG. 7A represents a grid 700 overlaid on the map 600. Grid 700 includes a plurality of cells 702, 704. Each cell may include a respective identifier unique to that cell and may be sized to correspond to an acceptable delivery area, such as 3 feet by 3 feet if a catch area of the MRU is 2 feet by 2 feet. Of course, other smaller or larger grid cells may be used to increase the flexibility of the delivery system.

Figure 7B:
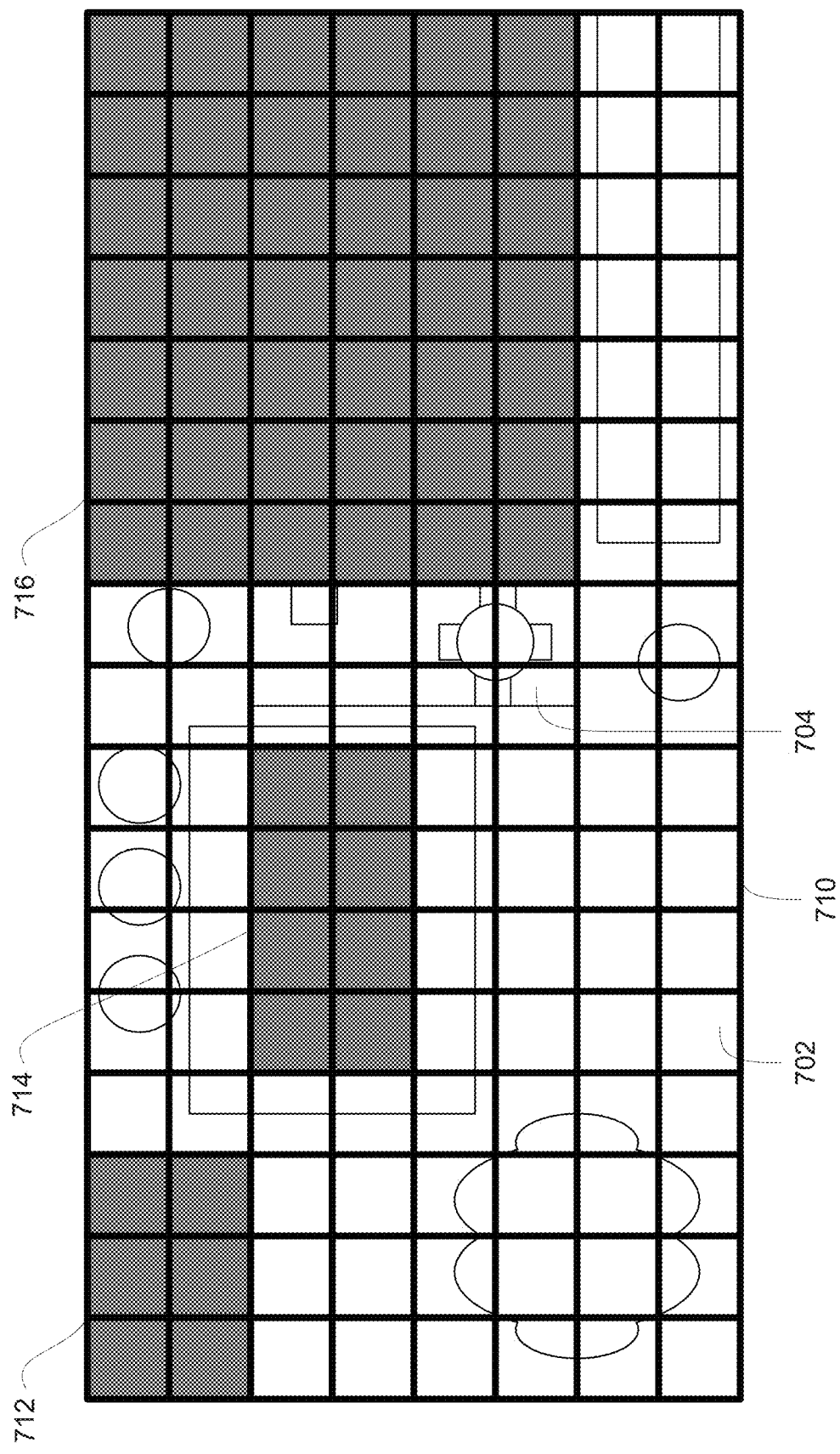

The recipient (or other operator) may use the client computing device 520 to designate specific grid cells as appropriate or not appropriate for delivery. In other words, as shown in block 1014 of FIG. 10A, the client computing device 520 may receive user input at the user inputs 526 one or more grid cells as appropriate for delivery and/or one or more grid cells as not appropriate for delivery. For instance, referring to FIG. 7B, shaded grid cells 712, 714, and 716 of grid 710 may represent areas that have been designated as not appropriate for delivery, and all other cells of the grid may be designated as appropriate for delivery. In this regard, grid 710 represents the grid 700 that also identifies cells that are designated as appropriate or not appropriate for delivery.

The granularity of these designations may be such that the recipient may flag features of certain cells. For instance, cells 714 may be flagged as "pool" or cells corresponding to the patio 630 may be flagged as "patio." This may allow the recipient to identify particular preferences such as "not near the pool" or "only on the patio." In some instances, the recipient may also identify which cells or areas are preferred and which are less preferred for deliveries. In addition or alternatively, the client computing device 520 may receive user input, again for instance via user inputs 526, identifying one or more recipient preferences. For instance, the recipient may identify preferences as a hierarchical list of locations and/or rules, such as: "If spot X is occupied, deliver to spot Y, if spot Y is occupied, deliver to spot Z, if my MRU cannot reach any of these spots, do not deliver or try again tomorrow, or notify me that there is a problem."

The recipient may also use the client computing device to designate a storage area where the MRU is able to securely park itself once a package has been delivered by the UAV. For instance, as shown in block 1016 of FIG. 10A, the client computing device may receive user input, again at the user inputs 526, selecting, identifying or otherwise designating a cell of the grid as a storage area. For instance, returning to FIG. 7B, cell 704 may be designated as a storage area. As such, designation may be effected via the application (by identifying a particular grid cell). In addition or alternatively, this designation may be affected by placing some feature corresponding to the storage area, such as a pad, a lockable housing structure (which the MRU is able to unlock via a signal or physical action), etc. In this regard, the storage area may allow for storing the MRU before and/or after a package is delivered to the MRU. Because the recipient is able to control the location of the storage area, he or she may select a location according to his or her own preferences such as an open area, as in the example of the area of grid cell 704, or in a secure area such as under a deck, within a shed, within a garage, in a house through a pet door, etc.

Once the storage area is designated, the client computing device 520 may send the map and/or grid, including any designations, and recipient preferences to the server computing devices 510 as well as the computing devices 410 of the MRU 300 as shown in blocks 1520 1522, 1524 of FIG. 10A. At block 1026, the server computing devices may store this information in storage system 540, and relayed to the MRU 300 if not sent by the client computing device 520, as shown at block 1026. Also, as shown in block 1028, the MRU may store the information in data 316.

Figure 7C:
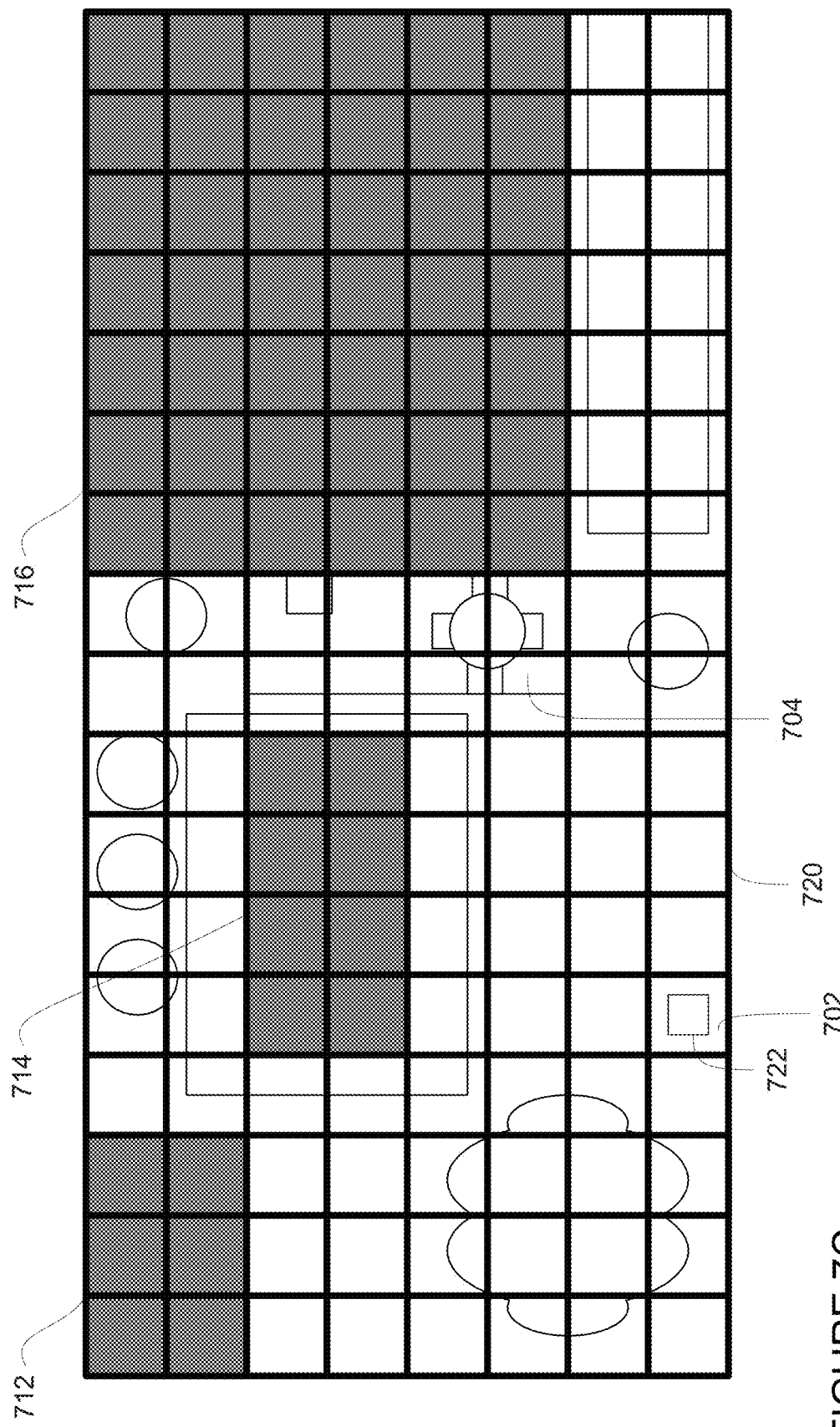

The recipient (or other operator) may place the MRU 300 at the storage area and allowing the computing devices 410 to move the MRU through the space around area. This movement may allow the computing devices 410 collect sensor feedback in the delivery area and thereby to identify grid cells of map through which the MRU is able to maneuver and/or accept packages. Thus, as shown in block 1030, the MRU may perform supplemental mapping and update the grid as needed. This supplementary mapping may be performed periodically, such as at a timeframe set by the recipient (or other operator), or in response to a notification that a delivery is expected. As such, the MRU 300 may perform supplementary mapping to identify any changes to the landscape which would prevent the MRU from reaching a grid cell designated for delivery. Such changes may include for instance, a fallen tree, lawn mower, toys, piles of leaves or debris, or other obstacle. For instance, as shown in FIG. 7C, grid cell 702 is now blocked by an obstacle 722 which was not present at the time that the grid cells were initially designated.

Turning to FIG. 10B at block 1032, once a delivery is going to occur, the server computing devices 510 may send instructions to dispatch a UAV of the group of UAVs, such as a UAV 200, to pick up a package and deliver it to a recipient at a particular delivery area. The computing devices 210 of the UAV 200 may also be provided with the grid, designations, and recipient preferences for the delivery area as well as information necessary to communicate with the MRU 300 as discussed further below. At block 1034, the computing devices 210 may receive the dispatch instructions including the grid 710 and information identify which grid cells of the grid are appropriate or not appropriate for delivery as well as any recipient preferences. The computing devices 210 may use the dispatch instructions to maneuver the UAV 200 to the delivery area as at block 1036.

The server computing devices 510 may also send a notification to the recipient via the application and/or the MRU 300, though the MRU need not be provided which such information prior to a delivery. However, the notification may allow the recipient to place the MRU 300 outside or in an appropriate location and/or allow the MRU to maneuver itself to an appropriate location.

Figure 8:
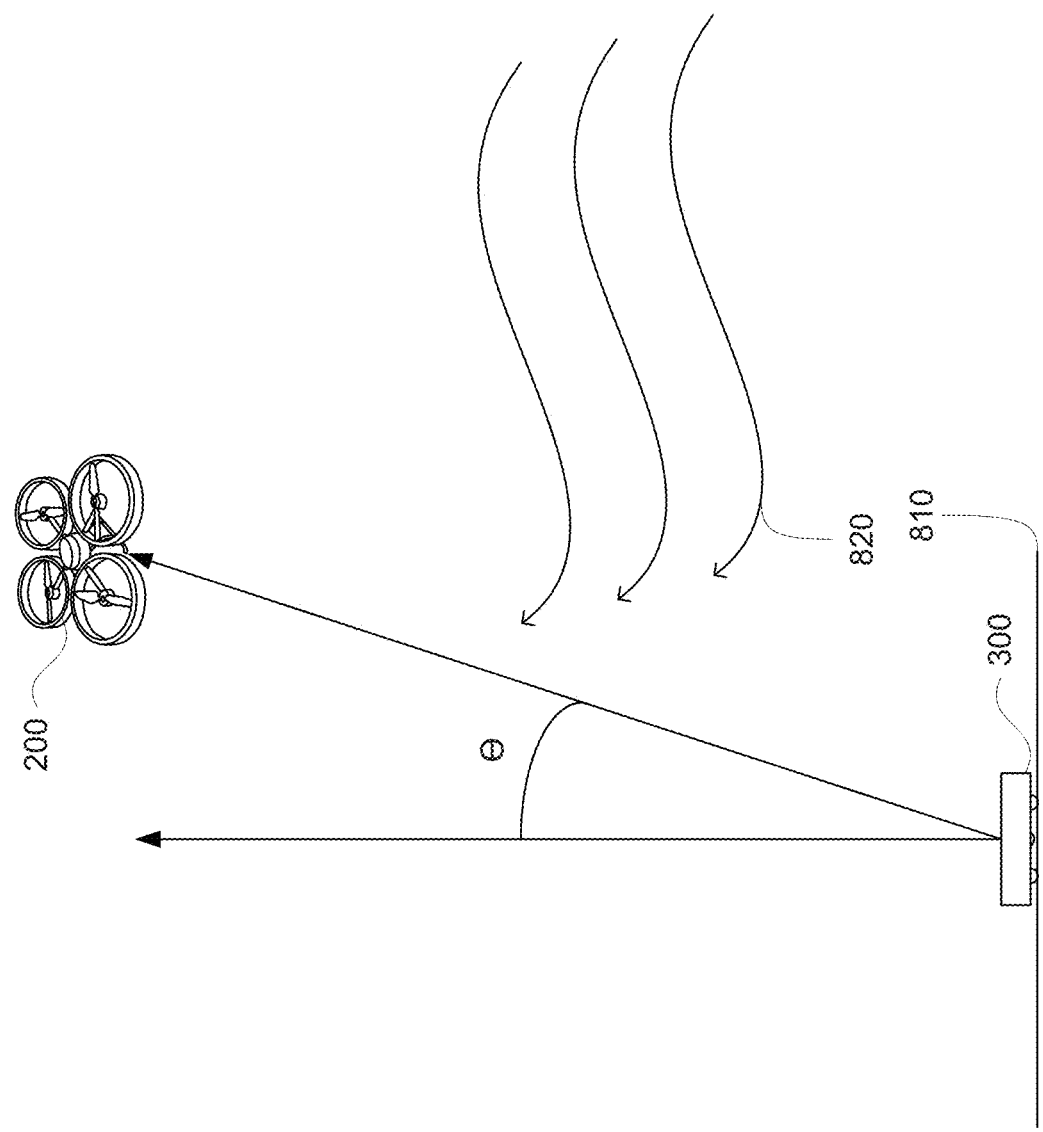
FIG. 8 is an example representation of a UAV and an MRU in accordance with aspects of the disclosure.

As shown in block 1038, the computing devices 410 of the MRU may identify grid cells appropriate for a delivery. This may include a multi-step process where the computing devices 410 identify a first set of grid cells using any preferences identified by the recipient (or other operator) as discussed above. For instance, as shown in grid 730 of FIG. 7C, a first set of grid cells, corresponding to the non-shaded grid cells of grid 710, may be determined based on the areas designated not appropriate or appropriate for delivery as shown in FIG. 8.

Figure 7D:
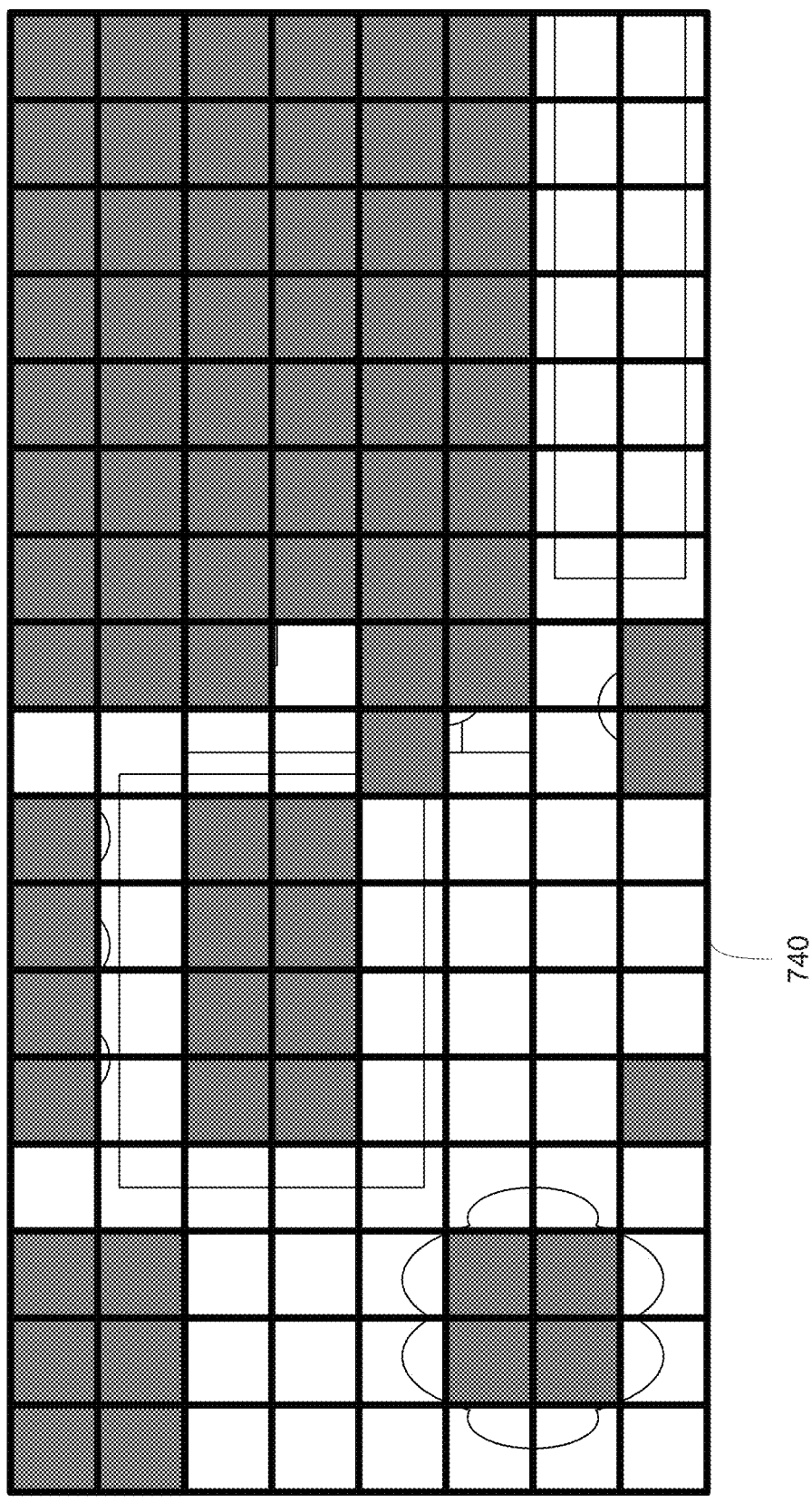

Next, at block 1040 of FIG. 10B, this first set of grid cells may be filtered or otherwise used to determine a second set of grid cells corresponding to cells where the MRU 300 is able to reach. For instance, as shown in grid 740 of FIG. 7D, because the MRU 300 is not able to traverse through patio furniture on the patio 630, through a trunk of tree 660, through shrubs 670, 672, 674 and through obstacle 722 of grid cell 702, such grid cells of grid 1000 are depicted as shaded to indicate that those cells are not reachable by the MRU. In this regard, the non-shaded grid cells of grid 740 are the second set of grid cells each of which correspond to grid cells appropriate to accept delivery by the MRU 300.

Figure 7E:
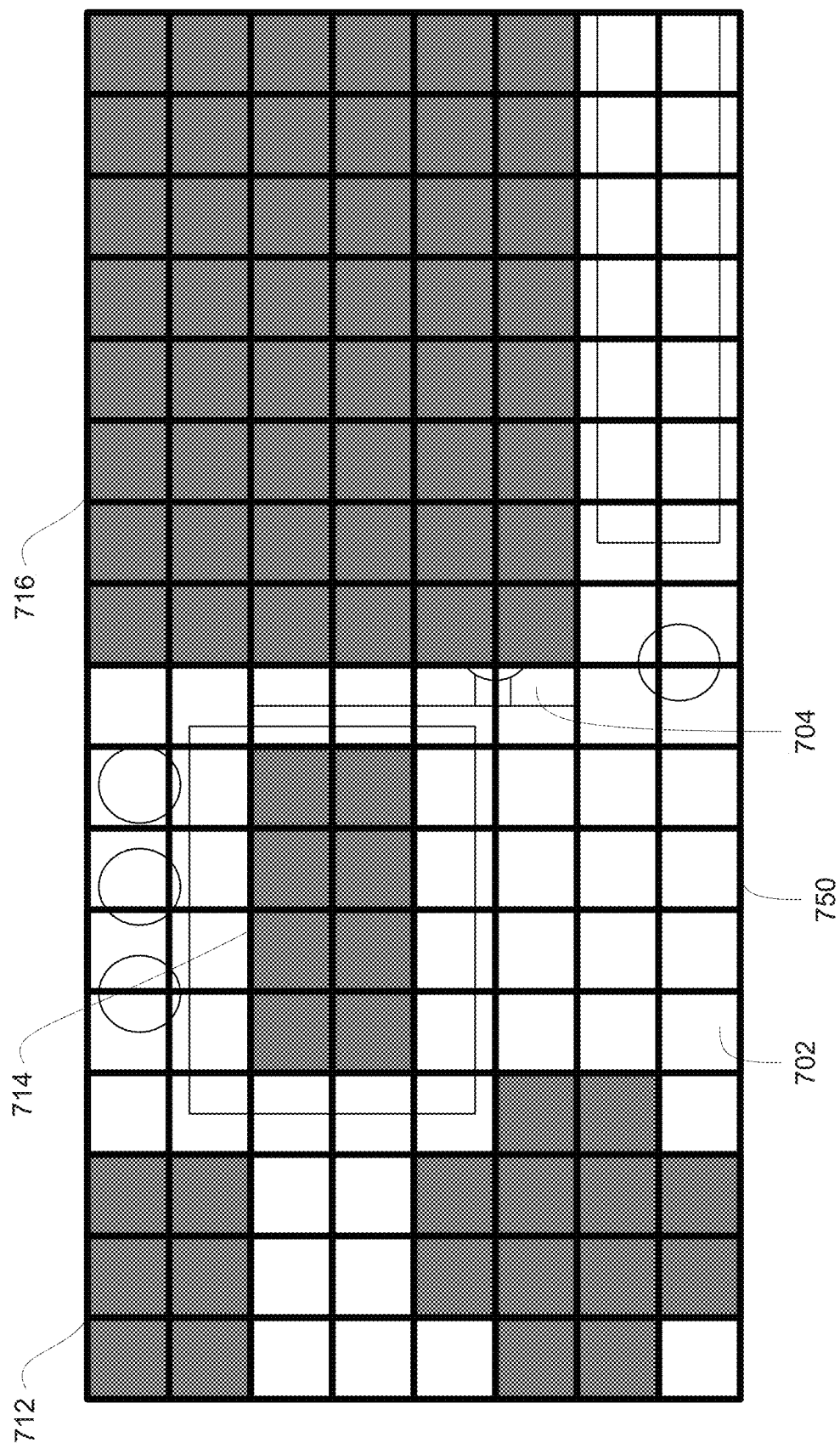

Returning to FIG. 10B, at block 1042, as the UAV 200 approaches and/or is over the delivery area, the plurality of sensors 240 may capture sensor feedback for the delivery area using the plurality of sensors 240. Given the nature of the information required for a delivery, the UAV 200 need not capture and/or store any data from beyond the delivery area for safety and privacy reasons. At block 1044, the computing devices 210 may use the sensor feedback to identify grid cells of the grid 710 having locations that would be appropriate for delivery of a package, for instance, based on whether there are nearby objects, such as trees, garages, sheds, or other structures, which may make delivering a package to the location of that grid cell more or less difficult. This may also include identifying and monitoring non-static objects that may affect delivery, such as a lawn mower or an active dog. For instance, as shown in FIG. 7E, grid 750 includes shaded cells around the entire area of tree 660 as well as near the residential house 610 as these objects may create obstacles for the UAV 200 even where the UAV would only need to fly within some small distance, such as 2 feet or more or less, next to those objects and not necessarily over those objects.

At the same time, as shown in block 1046 of FIG. 10B, the UAV may attempt to communicate with the MRU, for instance, via the network 550. For instance, computing devices 210 may attempt use communication system 250 to communicate with the computing devices 410 via the communication system 450. In some instances, this may include some authentication processes, such as a typical encrypted token, key or password exchange. In addition or alternatively, a proximity-based approach, where only a UAV within a certain sensory radius of an MRU should activate the authentication process with that MRU, may be used. As another example, the computing devices 210 of the UAV 200 may attempt to access a nearby local wireless network, such as a home or business network of the recipient, for instance, using a one-time encrypted authentication code to communicate with the MRU. In addition or alternatively, the computing devices 210 of the UAV 200 may directly (or via the server computing devices) sending a notification to a recipient's client computing devices where the recipient or other user may be allowed to approve or deny the delivery request.

In response to the establishment of the communication link at block 1048 of FIG. 10B, the computing devices 410 of the MRU 300 may send the map and grid cells or simply the identifiers for the identified grid cells appropriate for delivery (i.e. the second set) to the computing devices of the UAV as shown in block 1050. For instance, the non-shaded cells of grid 730 of FIG. 7C may be sent by the computing devices 410 to the computing devices 210 via communication systems 450 and 250.

Figure 7F:
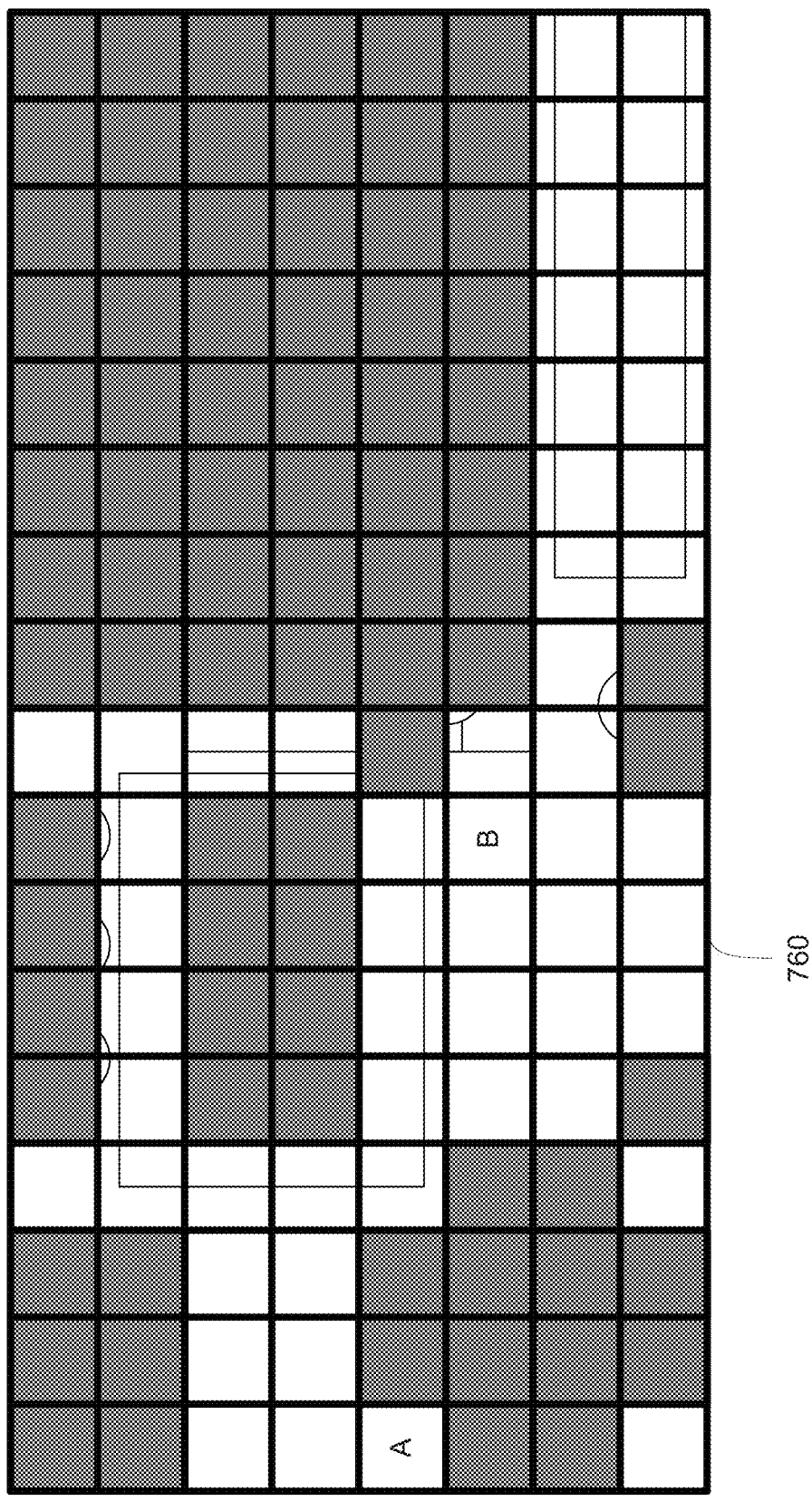

The computing devices 210 of the UAV 200 may then receive and compare the grid cells identified by the UAV's computing devices with those identified by the computing devices 410 of the MRU 300 in order to identify a common grid cell for the delivery as at blocks 1052 and 1054 of FIGS. 10B and 10C. FIG. 7F represents a comparison grid 760 of non-shaded cells between grid 740 and grid 750. In some instances, where there is more than one such grid cell, the computing devices 410 may use any recipient preferences to identify a common grid cell for the delivery. For instance, if there is a recipient preference that the delivery be attempted as close far from the patio as possible, grid cell A may be selected. If there is a recipient preference that the delivery be attempted as close as possible to the patio, but not on the patio, grid cell B may be selected.

As an alternative, the server computing devices 510, for instance when dispatching the UAV 200, may provide the UAV with information identifying the grid cells designated by the recipient (or other operator) for delivery. In this regard, in addition to or rather than having the MRU use this information to identify cells or areas appropriate for delivery, the UAV may also identify the grid cells appropriate for delivery for the UAV using this information.

In addition or alternatively, the computing devices 410 of the MRU 300 may rank the identified grid cells appropriate for delivery based on proximity to the storage area, ease or time reaching from the current location of the MRU, ease of returning to the storage area from the location of the grid cell, etc. As such, the computing devices 210 of the UAV 200 may select a highest ranking grid cell which corresponds to a grid cell identified by the UAV's computing devices for the delivery. Similarly, the computing devices 210 of the UAV 200 may rank the identified grid cells appropriate for delivery based on whether there are nearby objects, such as trees, garages, sheds, or other structures, which may make delivering a package to the location of that grid cell more or less difficult. The computing devices 210 may select a highest ranking grid cell which corresponds to a grid cell identified by the computing devices of the MRU. In yet another instance, both the computing devices 210 of the UAV 200 and the computing devices 410 of the MRU 300 may rank identified grid cells, and the computing devices of the UAV may identify the highest ranking common grid cell for the delivery.

Once a grid cell for the delivery has been identified, this corresponding identifier for that grid cell may be sent to the computing devices 410 of the MRU 300 as shown in block 1056 of FIG. 10C. For instance, the identifiers for grid cells A or B (depending upon which grid cell is selected) may be sent to the computing devices 410. In response to receiving the identifier at block 1058, the computing devices 410 may maneuver the MRU 300 to the location of the grid cell corresponding to the received identifier as shown in block 1060. After the location is reached, as in block 1062, the hinged panels 340-345 may be opened as shown in FIGS. 3C and 3D in order to reveal the receptacle area 320 and prepare for the delivery Immediately before or after this, the computing devices 410 of the MRU 300 may also send a notification to the computing devices 210 of the UAV 200 indicating that the MRU is ready for the delivery.

The computing devices 210 may also maneuver the UAV 200 to a delivery position, for instance directly overhead of and within some predetermined distance of the area of the identified grid cell as at block 1064 of FIG. 10B. Once the computing devices 210 of the UAV 200 has maneuvered the UAV in place relative to the identified grid cell in order to attempt the delivery, the UAV may lower a cable of the package delivery system 260 with an attached package towards the receptacle area 320 in order to attempt delivery as at block 1066. Once the package has reached the receptacle area 320, the computing devices 210 of the UAV 200 may use the package delivery system 260 to release the package from the cable and retract the cable.

Additional communications between the computing devices of the UAV and MRU may further facilitate delivery and allow the computing devices 210 of the UAV 200 to confirm the delivery as at block 1068. For instance, the placement of the package within the receptacle area 320 may be confirmed by activation of the sensor 322 which may send a signal to the computing devices 410 of the MRU 300 allowing the computing devices of the MRU to confirm delivery as at block 1070. In some examples, before the UAV is able or permitted to leave, the computing devices 410 of the MRU 300 may send a confirmation to the computing devices 210 of the UAV 200 indicating that the delivery was successful. In addition or alternatively, the UAV may be equipped with a camera or video recorder, for instance as part of the plurality of sensors 240, configured to capture the moment of a successful delivery in order to log the delivery and provide test images or video recording the function of the MRU 300. Thereafter, the computing devices 210 may maneuver the UAV 200 to another location as at block 1072, for instance using additional instructions from the server computing devices 510 in order to pick up another package for deliver or effect another delivery. At block 1074, the computing devices 210 may also use the package acceptance system 450 to pivot close the hinged panels 340-345 as shown in FIGS. 3A, 3B, and 3C. The computing devices 410 may then use the map to maneuver the MRU to the storage area as at block 1076 of FIG. 10C.

After reaching the storage area, for instance, grid cell 704, a notification indicating that a package has been delivered and is located in the storage area may be sent to the recipient. The notification may be sent via text message, email, a notification via the application, or a separate notification unit (for instance, a box that lights up and/or provides an audible notification in response to receiving a signal via Bluetooth, NFC, 3G, LTE, other communications network or protocol that a package has been delivered and is located in the storage area and/or that the MRU is in the storage area) over network 550. This notification may be initiated by the computing devices 410 of the MRU 300, a transmitter within the storage area (for instance, reacting in response to a signal from a pressure sensor, switch or other device that can confirm the location of the MRU in the storage area), and/or in response to the backend server computing devices receiving a corresponding notification from the computing devices of the MRU and/or the computing devices 210 of the UAV 200.

In some instances, the computing devices 410 of the MRU 300 may direct the MRU to a charging station at fixed time intervals, or when battery power goes below some predetermined level, such as 50% of capacity or more or less). In such cases, the recipient may be notified at a client computing device, such as client computing device 520, via the via text message, email, or a notification via the application if the MRU 300 is unable to reach the charging station, or has gone below some lower predetermined level, such as 40% of capacity or more or less, such that the MRU is unable to reach the charging station. This may allow the recipient to intervene and unblock or charge the MRU 300.

In some instances, the MRU may be unable to reach the storage area. This may be because the storage area has become obstructed for for some other reasons. To address such circumstances, a secondary and tertiary option for the MRU to go to may also be provided or otherwise designated by an operator. If such additional options become unavailable or unreachable, the MRU may be controlled in order to maneuver itself to an area that is sheltered as determined by the plurality of sensors 340. For instance, a photoresistor (light detecting resistor), a humidity or other water detection sensor, and a thermometer or other heat sensor could be used to direct the MRU to a place that is not in direct sunlight or in other words exposed to the elements, not wet or damp, or too hot.

In situations in which the computing devices 210 of the UAV 200 are unable to establish communication with the computing devices 410 of the MRU 300 to complete a delivery, such as where the computing devices of the UAV initiate the protocol to connect with the computing devices of the MRU one or more times without success, the recipient may receive a notification indicating that attempted delivery is in progress but the MRU is non responsive. If the recipient confirms receiving the notification within some threshold period of time, such as 60 seconds or more or less (for instance by clicking a button saying 'I will check the MRU now'), the UAV 200 may fall back to a safe holding location, such as the storage location, while the recipient (or another person) enters the delivery area to check the MRU. Once the recipient addresses the MRU and ensures that the MRU is connected to the network 550 and in working order, the recipient may request for the UAV to retry the delivery. The computing devices 210 of the UAV 200 may then again attempt to initiate the communication with the computing devices 410 of the MRU 300 via communication system 250.

In some instances, weather conditions, such as wind can affect the delivery conditions. As such, the UAV may also include an anemometer to determine wind speed and direction. In addition, one or more anemometers may be placed around the delivery area with transmitters for sending information to the computing devices of the UAV and/or, as noted above, the plurality of sensors 340 of the MRU 300 may also include an anemometer which provides sensor feedback to the computing devices 410 which can also use the communication system 450 send this information to the computing devices 210 of the UAV 200. For instance, referring to FIG. 8, rather than being positioned directly above the MRU 300 at the area 810 corresponding to the identified grid cell, the computing devices 210 of the UAV 200 may position itself at some offset angle Θ in order to account for wind (using measurements from both the an anemometer of the UAV and an anemometer of the MRU) pushing the package in the direction of arrows 820 representing the wind. Using information from one or more anemometer as well as weight information for the package, the computing devices 410 of the UAV 200 may determine how to position the UAV relative to the location of the identified cell in order to allow the wind to move the package over the receptacle area 320 and thereby deliver the package to the receptacle area.

Figure 9:
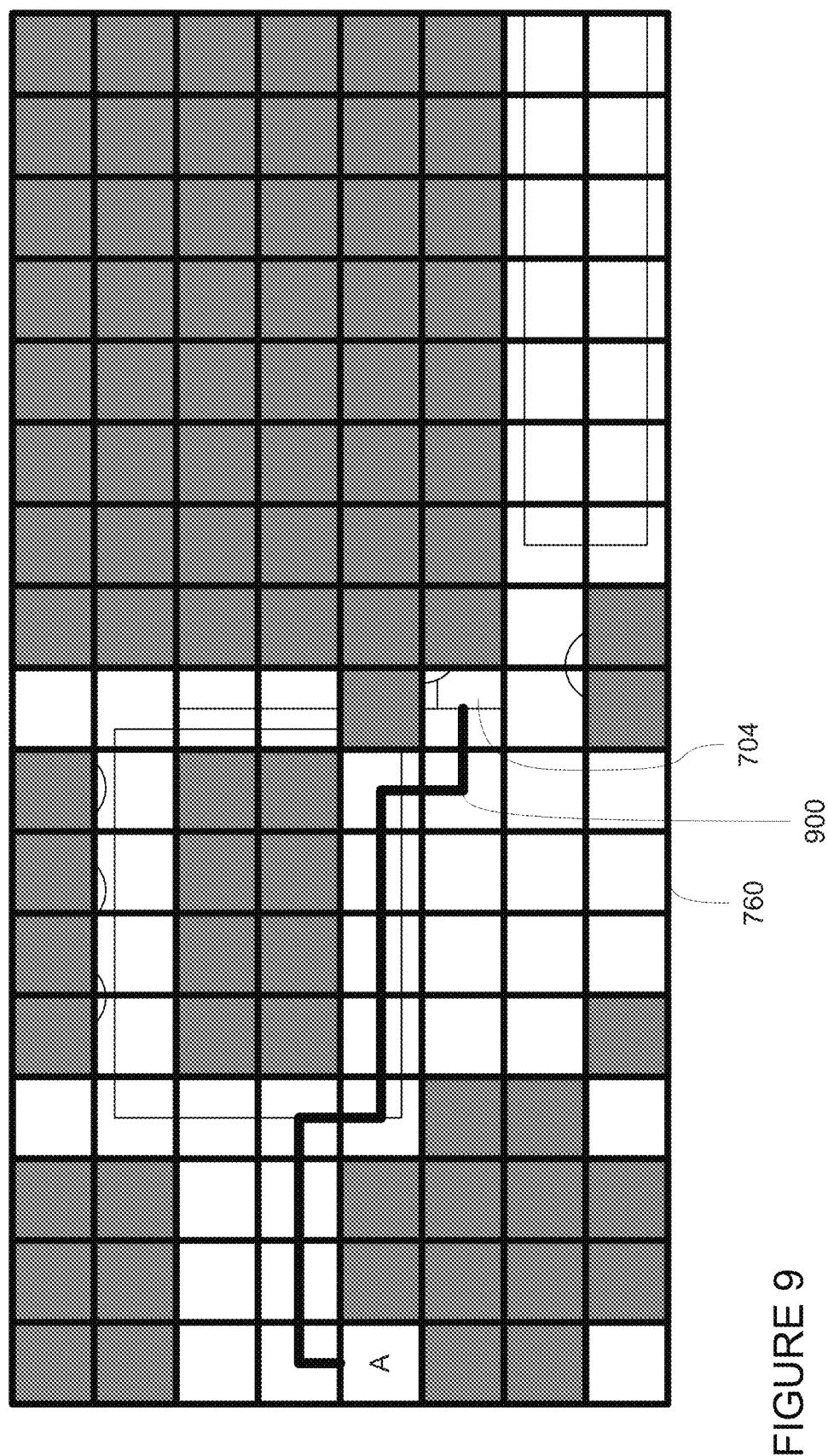
FIG. 9 is another example of a grid in accordance with aspects of the disclosure.

In addition or alternatively, the computing devices 210 of the UAV 200 may provide the sensor feedback from the plurality of sensors 240 to the computing devices 410 of the MRU 300 in order to assist the MRU in maneuvering through the delivery area. For instance, the computing devices 410 of the MRU 300 may receive images, LIDAR information, or other sensor data (raw or processed). Alternatively, rather than sending sensor data, the computing devices 210 of the UAV 200 may provide a path for the MRU to follow from the identified grid cell through the delivery area in order to most efficiently reach the storage area. For instance, as shown in FIG. 9, UAV 200 may provide the MRU with path 900 from grid cell A (where the MRU and UAV have or will attempt delivery) to the area of grid cell corresponding 704 to the storage area. In such cases, the identification of a grid cell for delivery may be performed by the computing devices 210 of the UAV 200 without any assistance (receiving identifiers) from the computing devices 410 of the MRU 300.

Although the MRU is described as purely terrestrial, in some instances, the MRU may also be capable of flight. For instance, the MRU may also be a UAV, though somewhat smaller and less sophisticated than the UAV 200 for cost savings, for instance, a low-flying UAV capable bringing a package to the delivery area according to any of the recipient's preference.

In addition, although the examples provided relate to outdoor residential deliveries, the features described herein may be appropriate for any number of delivery circumstances. For instance, such deliveries may also be made in warehouses, industrial areas, corporate areas, and other settings.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A delivery system comprising:
an unmanned aerial vehicle (UAV) having one or more UAV computing devices configured to:
receive sensor data for a predetermined delivery area;
use the sensor data to identify one or more grid cells of a grid corresponding to a map of the predetermined delivery area, the identified one or more grid cells corresponding to locations acceptable for delivery by the UAV;
receive, from a mobile receptacle unit (MRU), information identifying a set of grid cells of the grid identified by the MRU as being acceptable for delivery;
determine a delivery location by identifying a common grid cell between the identified one or more grid cells and the set of grid cells received from the MRU;
send the common grid cell to the MRU to instruct the MRU to navigate to the common grid cell in order to attempt a delivery of a package at the delivery location; and
attempt the delivery of the package to the MRU while the MRU is present at the delivery location;
a sensor configured to identify when the MRU is located in a storage area for storing the MRU after the package is delivered to the MRU, wherein the MRU is configured to maneuver to the storage area after a completed delivery and an end user of the delivery system designates where the storage area is located; and
a receiving computing device which is configured to receive an indication of where the end user designates the storage area is located, wherein the receiving computing device may or may not be part of the UAV.

2. The system of claim 1, wherein the one or more UAV computing devices are further configured to rank the identified one or more grid cells, and wherein the ranking is also used to identify the common grid cell where there is initially more than one common grid cell.

3. The system of claim 1, wherein the one or more UAV computing devices are further configured to receive, from the MRU, a ranking for the set of grid cells, and wherein the ranking is also used to identify the common grid cell where there is initially more than one common grid cell.

4. The system of claim 3, wherein the one or more UAV computing devices are further configured to rank the identified one or more grid cells, and wherein the ranking of the identified one or more grid cells is also used to identify the common grid cell where there is initially more than one common grid cell.

5. The system of claim 1, wherein the one or more UAV computing devices are further configured to:
maneuver the UAV to a delivery position with respect to the delivery location;
receive confirmation that the MRU is located at the delivery location; and
attempt to deliver the package to the MRU from the delivery position.

6. The system of claim 5, wherein the one or more UAV computing devices are further configured to:
receive sensor information identifying wind conditions at the predetermined delivery area; and
use the sensor information to maneuver the UAV to the delivery position.

7. The system of claim 6, wherein the sensor information is received from an anemometer of the UAV.

8. The system of claim 6, wherein the sensor information is received from an anemometer of the MRU.

9. The system of claim 1, further comprising the MRU.

10. The system of claim 9, wherein the MRU includes one or more panels configured to open in order to reveal a receptacle area of the MRU, and wherein the receptacle area is configured to accept delivery of the package from the UAV.

11. The system of claim 10, wherein the one or more panels include at least two panels, and wherein the MRU further includes mesh material arranged between the at least two panels in order to increase a likelihood of the package reaching the receptacle area.

12. The system of claim 10, wherein the one or more panels are configured to close in order to enclose the package within the receptacle area.

13. The system of claim 10, wherein the receptacle area includes a sensor configured to confirm delivery of the package.

14. The system of claim 9, wherein the MRU further includes one or more MRU computing devices configured to:
   maneuver the MRU through the predetermined delivery area and collect sensor data for the predetermined delivery area while maneuvering the MRU;
   identify obstacles in the predetermined delivery area that would prevent the MRU from accepting a delivery at the area of the identified obstacles; and
   use the identified obstacles to identify the set of grid cells.

15. The system of claim 14, wherein the one or more MRU computing devices are further configured to:
   receive recipient preferences indicating one or more preferred or nonpreferred locations within the predetermined delivery area for delivery of the package to the MRU, wherein the predetermined delivery area comprises an area of land; and
   use the recipient preferences in order to identify the set of grid cells.

16. The system of claim 15, wherein the one or more MRU computing devices are configured to identify the set of grid cells by:
   identifying a first set of grid cells using the identified obstacles; and
   filtering the first set of grid cells to identify the set of grid cells.

17. The system of claim 1, wherein the one or more UAV computing devices are further configured to:
   receive one or more recipient preferences indicating one or more preferred or nonpreferred locations within the predetermined delivery area for delivery of the package to the MRU, wherein the predetermined delivery area comprises an area of land; and
   use the one or more recipient preferences to identify the common grid cell.

18. The system of claim 17, wherein the one or more recipient preferences include conditional rules for identifying the common grid cell.

19. The system of claim 1, further comprising a notification device configured to provide a notification when the MRU is located in the storage area.

* * * * *